United States Patent
Yi

(10) Patent No.: US 9,872,257 B2
(45) Date of Patent: Jan. 16, 2018

(54) METHOD AND APPARATUS FOR CONTROLLING UPLINK POWER IN WIRELESS COMMUNICATION SYSTEM

(71) Applicant: LG ELECTRONICS INC., Seoul (KR)

(72) Inventor: Yunjung Yi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 8 days.

(21) Appl. No.: 14/916,493

(22) PCT Filed: Sep. 4, 2014

(86) PCT No.: PCT/KR2014/008346
§ 371 (c)(1),
(2) Date: Mar. 3, 2016

(87) PCT Pub. No.: WO2015/034302
PCT Pub. Date: Mar. 12, 2015

(65) Prior Publication Data
US 2016/0212711 A1 Jul. 21, 2016

Related U.S. Application Data

(60) Provisional application No. 61/873,804, filed on Sep. 4, 2013, provisional application No. 61/927,503, filed
(Continued)

(51) Int. Cl.
*H04W 52/14* (2009.01)
*H04W 72/04* (2009.01)
(Continued)

(52) U.S. Cl.
CPC ....... *H04W 52/146* (2013.01); *H04W 52/281* (2013.01); *H04W 52/34* (2013.01);
(Continued)

(58) Field of Classification Search
CPC ............ H04W 52/146; H04W 52/346; H04W 52/281; H04W 52/365; H04W 72/0473;
(Continued)

(56) References Cited

U.S. PATENT DOCUMENTS

2012/0044882 A1* 2/2012 Kim ..................... H04L 5/0058
370/329
2015/0117384 A1* 4/2015 Papasakellariou .. H04W 52/146
370/329
(Continued)

FOREIGN PATENT DOCUMENTS

JP 2012080540 4/2012
JP 2013534080 8/2013
(Continued)

OTHER PUBLICATIONS

PCT International Application No. PCT/KR2014/005903, Written Opinion of the International Searching Authority dated Sep. 29, 2014, 1 page.

*Primary Examiner* — Thai Nguyen
(74) *Attorney, Agent, or Firm* — Lee Hong Degerman Kang & Waimey

(57) ABSTRACT

A method and apparatus for controlling an uplink power in a wireless communication system is provided. A user equipment (UE) sets a first maximum power for a first set of uplink subframes for a first eNodeB (eNB) in which the UE can allocate up to the first maximum power to uplink signals to be transmitted to the first eNB, and sets a second maximum power for a second set of uplink subframes for the first eNB in which the UE can allocate up to the second maximum power to uplink signals to be transmitted to the first eNB. The uplink signals are transmitted to the first eNB only in the first set of uplink subframes. Further, the uplink
(Continued)

signals are transmitted to both the first eNB and a second eNB in the second set of uplink subframes.

12 Claims, 15 Drawing Sheets

Related U.S. Application Data on Jan. 15, 2014, provisional application No. 61/938,147, filed on Feb. 11, 2014, provisional application No. 61/940,379, filed on Feb. 15, 2014, provisional application No. 61/943,457, filed on Feb. 23, 2014, provisional application No. 61/976,486, filed on Apr. 7, 2014, provisional application No. 61/981,170, filed on Apr. 17, 2014, provisional application No. 61/984,030, filed on Apr. 24, 2014, provisional application No. 62/009,311, filed on Jun. 8, 2014, provisional application No. 62/014,120, filed on Jun. 19, 2014, provisional application No. 62/015,505, filed on Jun. 22, 2014, provisional application No. 62/033,630, filed on Aug. 5, 2014, provisional application No. 62/034,153, filed on Aug. 7, 2014.

(51) Int. Cl.
*H04W 72/10* (2009.01)
*H04W 52/34* (2009.01)
*H04W 52/36* (2009.01)
*H04W 52/28* (2009.01)
*H04L 5/00* (2006.01)
*H04W 52/40* (2009.01)

(52) U.S. Cl.
CPC ....... *H04W 52/346* (2013.01); *H04W 52/365* (2013.01); *H04W 52/367* (2013.01); *H04W 72/0473* (2013.01); *H04W 72/10* (2013.01); *H04L 5/001* (2013.01); *H04W 52/40* (2013.01)

(58) Field of Classification Search
CPC ... H04W 72/10; H04W 52/367; H04W 52/34; H04W 52/40; H04L 5/001
See application file for complete search history.

(56) References Cited

U.S. PATENT DOCUMENTS

2015/0173016 A1\* 6/2015 Heo ...................... H04W 52/54
  370/241
2016/0255593 A1\* 9/2016 Blankenship ....... H04W 52/146
  370/328

FOREIGN PATENT DOCUMENTS

| KR | 10-2012-0016987 | 2/2012 |
| KR | 10-2013-0053635 | 5/2013 |

\* cited by examiner

METHOD AND APPARATUS FOR CONTROLLING UPLINK POWER IN WIRELESS COMMUNICATION SYSTEM

CROSS-REFERENCE TO RELATED APPLICATIONS

This application is the National Stage filing under 35 U.S.C. 371 of International Application No. PCT/KR2014/008346, filed on Sep. 4, 2014, which claims the benefit of U.S. Provisional Application Nos. 61/873,804, filed on Sep. 4, 2013, 61/927,503, filed on Jan. 15, 2014, 61/938,147, filed on Feb. 11, 2014, 61/940,379, filed on Feb. 15, 2014, 61/943,457, filed on Feb. 23, 2014, 61/976,486, filed on Apr. 7, 2014, 61/981,170, filed on Apr. 17, 2014, 61/984,030, filed on Apr. 24, 2014, 62/009,311, filed on Jun. 8, 2014, 62/014,120, filed on Jun. 19, 2014, 62/015,505, filed on Jun. 22, 2014, 62/033,630, filed on Aug. 5, 2014 and 62/034,153, filed on Aug. 7, 2014, the contents of which are all hereby incorporated by reference herein in their entirety.

BACKGROUND OF THE INVENTION

Field of the Invention

The present invention relates to wireless communications, and more particularly, to a method and apparatus for controlling an uplink power in a wireless communication system.

Related Art

Universal mobile telecommunications system (UMTS) is a $3^{rd}$ generation (3G) asynchronous mobile communication system operating in wideband code division multiple access (WCDMA) based on European systems, global system for mobile communications (GSM) and general packet radio services (GPRS). A long-term evolution (LTE) of UMTS is under discussion by the $3^{rd}$ generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

To increase the capacity for the users' demand of services, increasing the bandwidth may be essential, a carrier aggregation (CA) technology or resource aggregation over intra-node carriers or inter-node carriers aiming at obtaining an effect, as if a logically wider band is used, by grouping a plurality of physically non-continuous bands in a frequency domain has been developed to effectively use fragmented small bands. Individual unit carriers grouped by carrier aggregation is known as a component carrier (CC). For inter-node resource aggregation, for each node, carrier group (CG) can be established here one CG can have multiple CCs. Each CC is defined by a single bandwidth and a center frequency.

In LTE Rel-12, a new study on small cell enhancement has started, where dual connectivity is supported. Dual connectivity is an operation where a given UE consumes radio resources provided by at least two different network points (master eNB (MeNB) and secondary eNB (SeNB)) connected with non-ideal backhaul while in RRC_CONNECTED. Furthermore, each eNB involved in dual connectivity for a UE may assume different roles. Those roles do not necessarily depend on the eNB's power class and can vary among UEs.

Uplink power control determines the average power over a single carrier frequency division multiple access (SC-FDMA) symbol in which the physical channel is transmitted. Uplink power control controls the transmit power of the different uplink physical channels. Efficient uplink power control method for CA or dual connectivity may be required.

SUMMARY OF THE INVENTION

The present invention provides a method and apparatus for controlling an uplink power in a wireless communication system. The present invention provides a method for setting a first maximum power for a first set of uplink subframes in which a user equipment (UE) can transmit uplink signals to a first eNodeB (eNB) only, and a second maximum power for a second set of uplink subframes in which the UE can transmit uplink signals to both the first eNB and the second eNB.

In an aspect, a method for controlling, by a user equipment (UE), an uplink power in a wireless communication system is provided. The method includes setting a first maximum power for a first set of uplink subframes for a first eNodeB (eNB) in which the UE can allocate up to the first maximum power to uplink signals to be transmitted to the first eNB, setting a second maximum power for a second set of uplink subframes for the first eNB in which the UE can allocate up to the second maximum power to uplink signals to be transmitted to the first eNB, and transmitting the uplink signals based on at least one of the first maximum power or the second maximum power.

In another aspect, a method for controlling, by a user equipment (UE), an uplink power in a wireless communication system is provided. The method includes triggering a power headroom report (PHR) upon detecting a change of pathloss, calculating a maximum power per carrier group, and transmitting the triggered PHR.

Uplink power can be controlled efficiently.

DESCRIPTION OF EXEMPLARY EMBODIMENTS

Techniques, apparatus and systems described herein may be used in various wireless access technologies such as code division multiple access (CDMA), frequency division multiple access (FDMA), time division multiple access (TDMA), orthogonal frequency division multiple access (OFDMA), single carrier frequency division multiple access (SC-FDMA), etc. The CDMA may be implemented with a radio technology such as universal terrestrial radio access (UTRA) or CDMA2000. The TDMA may be implemented with a radio technology such as global system for mobile communications (GSM)/general packet radio service (GPRS)/enhanced data rates for GSM evolution (EDGE). The OFDMA may be implemented with a radio technology such as institute of electrical and electronics engineers (IEEE) 802.11 (Wi-Fi), IEEE 802.16 (WiMAX), IEEE 802-20, evolved-UTRA (E-UTRA) etc. The UTRA is a part of a universal mobile telecommunication system (UMTS). 3rd generation partnership project (3GPP) long term evolution (LTE) is a part of an evolved-UMTS (E-UMTS) using the E-UTRA. The 3GPP LTE employs the OFDMA in downlink and employs the SC-FDMA in uplink. LTE-advance (LTE-A) is an evolution of the 3GPP LTE. For clarity, this application focuses on the 3GPP LTE/LTE-A. However, technical features of the present invention are not limited thereto.

Figure 1:
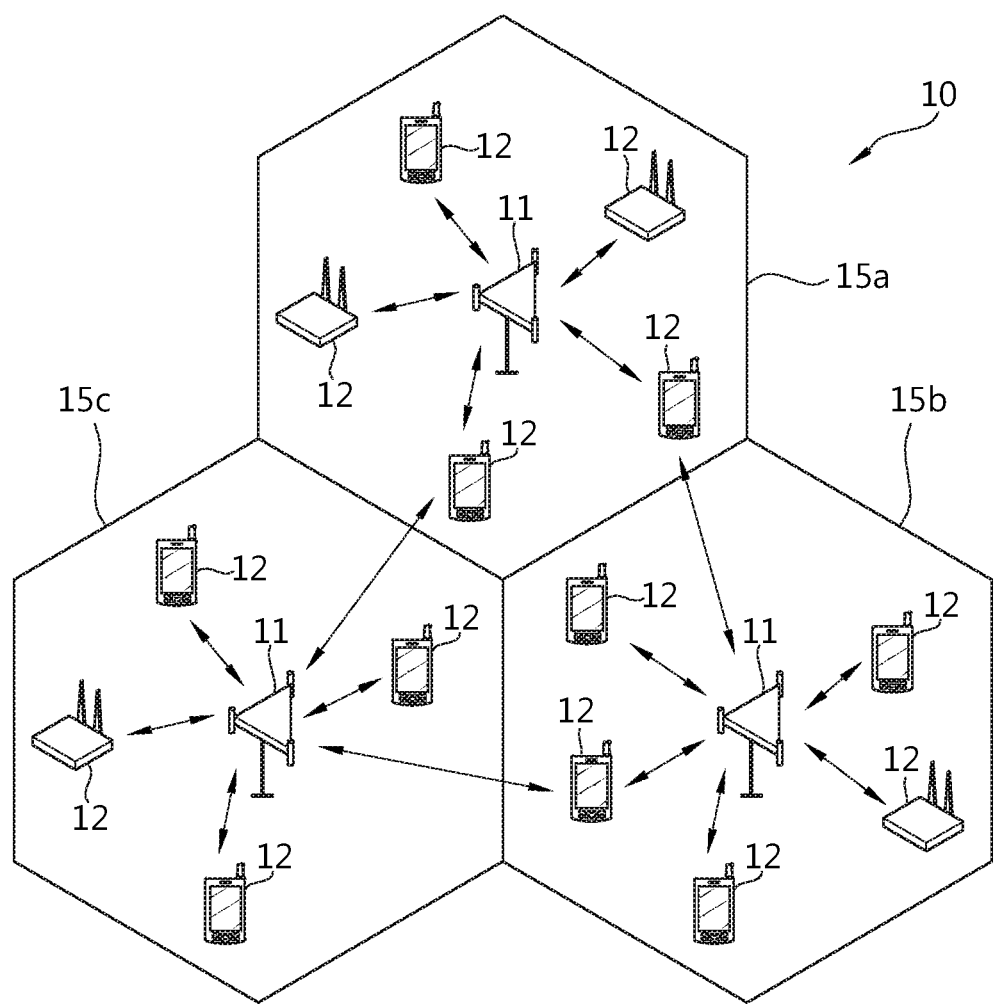
FIG. 1 shows a wireless communication system.

FIG. 1 shows a wireless communication system. The wireless communication system 10 includes at least one base station (BS) 11. Respective BSs 11 provide a communication service to particular geographical areas 15a, 15b, and 15c (which are generally called cells). Each cell may be divided into a plurality of areas (which are called sectors). A user equipment (UE) 12 may be fixed or mobile and may be referred to by other names such as mobile station (MS), mobile terminal (MT), user terminal (UT), subscriber station (SS), wireless device, personal digital assistant (PDA), wireless modem, handheld device. The BS 11 generally refers to a fixed station that communicates with the UE 12 and may be called by other names such as evolved-NodeB (eNB), base transceiver system (BTS), access point (AP), etc.

In general, a UE belongs to one cell, and the cell to which a UE belongs is called a serving cell. ABS providing a communication service to the serving cell is called a serving BS. The wireless communication system is a cellular system, so a different cell adjacent to the serving cell exists. The different cell adjacent to the serving cell is called a neighbor cell. A BS providing a communication service to the neighbor cell is called a neighbor BS. The serving cell and the neighbor cell are relatively determined based on a UE.

This technique can be used for downlink or uplink. In general, downlink refers to communication from the BS 11 to the UE 12, and uplink refers to communication from the UE 12 to the BS 11. In downlink, a transmitter may be part of the BS 11 and a receiver may be part of the UE 12. In uplink, a transmitter may be part of the UE 12 and a receiver may be part of the BS 11.

The wireless communication system may be any one of a multiple-input multiple-output (MIMO) system, a multiple-input single-output (MISO) system, a single-input single-output (SISO) system, and a single-input multiple-output (SIMO) system. The MIMO system uses a plurality of transmission antennas and a plurality of reception antennas. The MISO system uses a plurality of transmission antennas and a single reception antenna. The SISO system uses a single transmission antenna and a single reception antenna. The SIMO system uses a single transmission antenna and a plurality of reception antennas. Hereinafter, a transmission antenna refers to a physical or logical antenna used for transmitting a signal or a stream, and a reception antenna refers to a physical or logical antenna used for receiving a signal or a stream.

Figure 2:
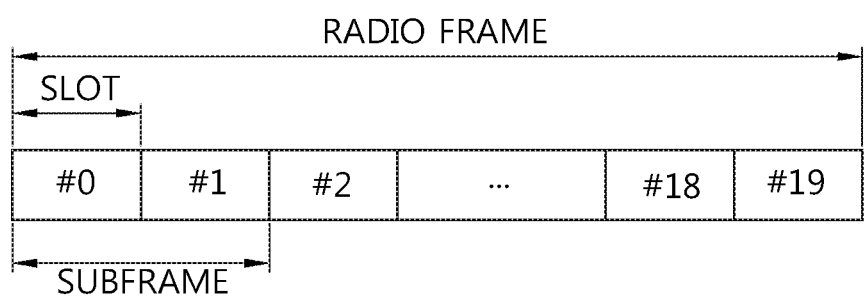
FIG. 2 shows structure of a radio frame of 3GPP LTE.

FIG. 2 shows structure of a radio frame of 3GPP LTE. Referring to FIG. 2, a radio frame includes 10 subframes. A subframe includes two slots in time domain. A time for transmitting one subframe is defined as a transmission time interval (TTI). For example, one subframe may have a length of 1 millisecond (ms), and one slot may have a length of 0.5 ms. One slot includes a plurality of orthogonal frequency division multiplexing (OFDM) symbols in time domain. Since the 3GPP LTE uses the OFDMA in the downlink, the OFDM symbol is for representing one symbol period. The OFDM symbols may be called by other names depending on a multiple-access scheme. For example, when SC-FDMA is in use as an uplink multi-access scheme, the OFDM symbols may be called SC-FDMA symbols. A resource block (RB) is a resource allocation unit, and includes a plurality of contiguous subcarriers in one slot. The structure of the radio frame is shown for exemplary purposes only. Thus, the number of subframes included in the radio frame or the number of slots included in the subframe or the number of OFDM symbols included in the slot may be modified in various manners.

3GPP LTE defines that one slot includes seven OFDM symbols in a normal cyclic prefix (CP) and one slot includes six OFDM symbols in an extended CP.

The wireless communication system may be divided into a frequency division duplex (FDD) scheme and a time division duplex (TDD) scheme. According to the FDD scheme, an uplink transmission and a downlink transmission are made at different frequency bands. According to the TDD scheme, an uplink transmission and a downlink transmission are made during different periods of time at the same frequency band. A channel response of the TDD scheme is substantially reciprocal. This means that a downlink channel response and an uplink channel response are almost the same in a given frequency band. Thus, the TDD-based wireless communication system is advantageous in that the downlink channel response can be obtained from the uplink channel response. In the TDD scheme, the entire frequency band is time-divided for uplink and downlink transmissions, so a downlink transmission by the BS and an uplink transmission by the UE cannot be simultaneously performed. In a TDD system in which an uplink transmission and a downlink transmission are discriminated in units of subframes, the uplink transmission and the downlink transmission are performed in different subframes.

Frame structure type 1 is applicable to both full duplex and half duplex FDD. Each radio frame is $T_f = 307200 \times T_s = 10$ ms long and consists of 20 slots of length $T_{slot} = 15360 \times T_s = 0.5$ ms, numbered from 0 to 19. A subframe is defined as two consecutive slots where subframe i consists of slots $2i$ and $2i+1$.

For FDD, 10 subframes are available for downlink transmission and 10 subframes are available for uplink transmissions in each 10 ms interval. Uplink and downlink transmissions are separated in the frequency domain. In half-duplex FDD operation, the UE cannot transmit and receive at the same time while there are no such restrictions in full-duplex FDD.

Frame structure type 2 is applicable to TDD. Each radio frame of length $T_f=307200 \times T_s=10$ ms consists of two half-frames of length $153600 \times T_s=5$ ms each. Each half-frame consists of five subframes of length $30720 \times T_s=1$ ms. The supported uplink-downlink configurations are listed in Table 1.

TABLE 1

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, for each subframe in a radio frame, "D" denotes the subframe is reserved for downlink transmissions, "U" denotes the subframe is reserved for uplink transmissions and "S" denotes a special subframe with the three fields downlink pilot time slot (DwPTS), guard period (GP) and uplink pilot time slot (UpPTS). Each subframe i is defined as two slots, 2i and 2i+1 of length $T_{slot}=15360 \times T_s=0.5$ ms in each subframe.

Uplink-downlink configurations with both 5 ms and 10 ms downlink-to-uplink switch-point periodicity are supported. In case of 5 ms downlink-to-uplink switch-point periodicity, the special subframe exists in both half-frames. In case of 10 ms downlink-to-uplink switch-point periodicity, the special subframe exists in the first half-frame only. Subframes 0 and 5 and DwPTS are always reserved for downlink transmission. UpPTS and the subframe immediately following the special subframe are always reserved for uplink transmission.

In case multiple cells are aggregated, the UE may assume that the guard period of the special subframe in the different cells have an overlap of at least $1456 \times T_s$. In case multiple cells with different uplink-downlink configurations are aggregated and the UE is not capable of simultaneous reception and transmission in the aggregated cells, the following constraints apply:

- if the subframe in the primary cell is a downlink subframe, the UE shall not transmit any signal or channel on a secondary cell in the same subframe
- if the subframe in the primary cell is an uplink subframe, the UE is not expected to receive any downlink transmissions on a secondary cell in the same subframe
- if the subframe in the primary cell is a special subframe and the same subframe in a secondary cell is a downlink subframe, the UE is not expected to receive physical downlink shared channel (PDSCH)/enhanced physical downlink control channel (EPDCCH)/physical multicast channel (PMCH)/positioning reference signal (PRS) transmissions in the secondary cell in the same subframe, and the UE is not expected to receive any other signals on the secondary cell in OFDM symbols that overlaps with the guard period or UpPTS in the primary cell.

Figure 3:
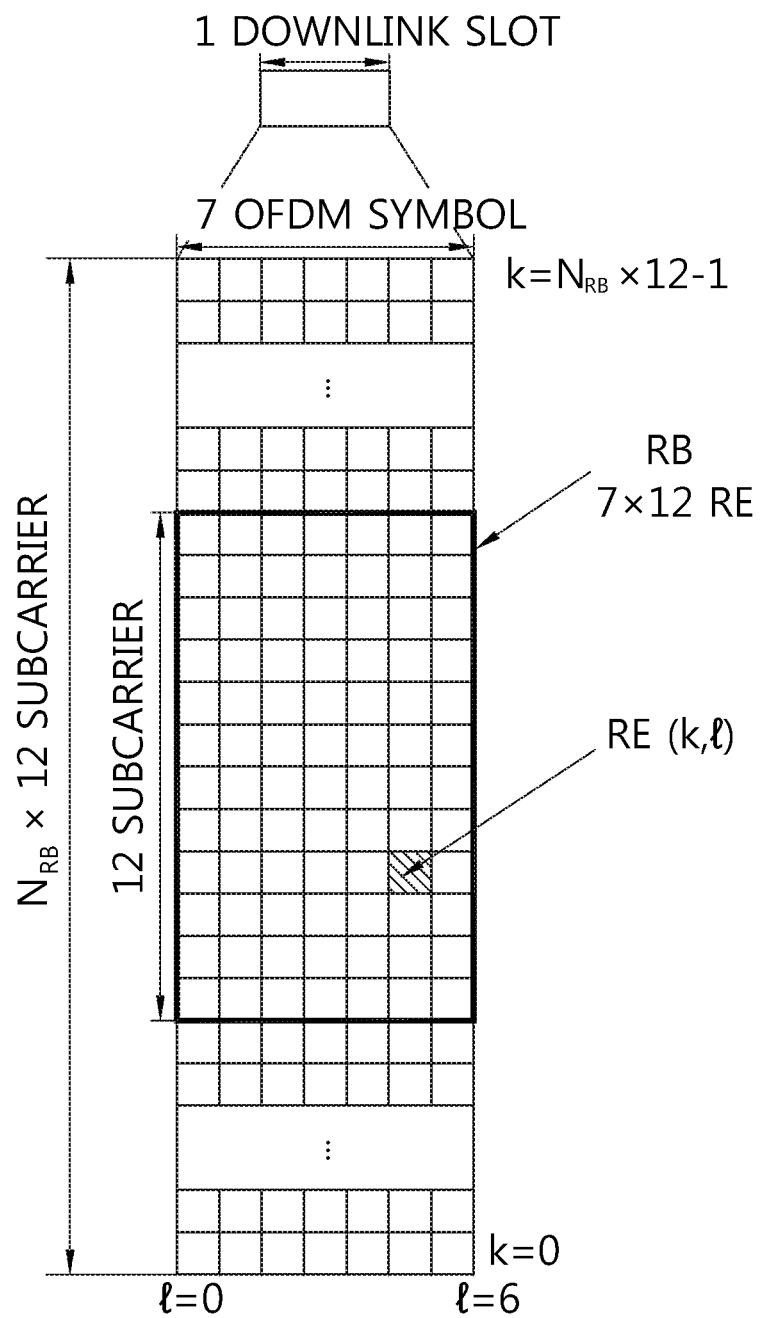
FIG. 3 shows a resource grid for one downlink slot.

FIG. 3 shows a resource grid for one downlink slot. Referring to FIG. 3, a downlink slot includes a plurality of OFDM symbols in time domain. It is described herein that one downlink slot includes 7 OFDM symbols, and one RB includes 12 subcarriers in frequency domain as an example. However, the present invention is not limited thereto. Each element on the resource grid is referred to as a resource element (RE). One RB includes 12×7 resource elements. The number $N^{DL}$ of RBs included in the downlink slot depends on a downlink transmit bandwidth. The structure of an uplink slot may be same as that of the downlink slot.

The number of OFDM symbols and the number of subcarriers may vary depending on the length of a CP, frequency spacing, and the like. For example, in case of a normal CP, the number of OFDM symbols is 7, and in case of an extended CP, the number of OFDM symbols is 6. One of 128, 256, 512, 1024, 1536, and 2048 may be selectively used as the number of subcarriers in one OFDM symbol.

Figure 4:
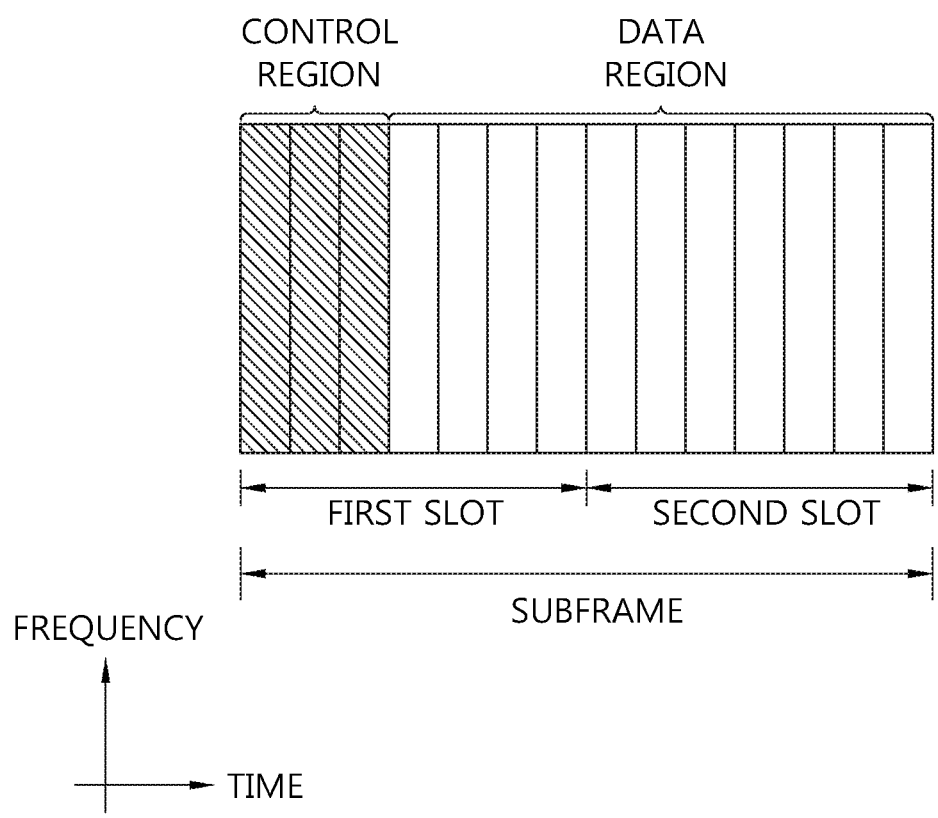
FIG. 4 shows structure of a downlink subframe.

FIG. 4 shows structure of a downlink subframe. Referring to FIG. 4, a maximum of three OFDM symbols located in a front portion of a first slot within a subframe correspond to a control region to be assigned with a control channel. The remaining OFDM symbols correspond to a data region to be assigned with a physical downlink shared chancel (PDSCH). Examples of downlink control channels used in the 3GPP LTE includes a physical control format indicator channel (PCFICH), a physical downlink control channel (PDCCH), a physical hybrid automatic repeat request (HARQ) indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/non-acknowledgment (NACK) signal. Control information transmitted through the PDCCH is referred to as downlink control information (DCI). The DCI includes uplink or downlink scheduling information or includes an uplink transmit (Tx) power control command for arbitrary UE groups.

The PDCCH may carry a transport format and a resource allocation of a downlink shared channel (DL-SCH), resource allocation information of an uplink shared channel (UL-SCH), paging information on a paging channel (PCH), system information on the DL-SCH, a resource allocation of an upper-layer control message such as a random access response transmitted on the PDSCH, a set of Tx power control commands on individual UEs within an arbitrary UE group, a Tx power control command, activation of a voice over IP (VoIP), etc. A plurality of PDCCHs can be transmitted within a control region. The UE can monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups.

A format of the PDCCH and the number of bits of the available PDCCH are determined according to a correlation between the number of CCEs and the coding rate provided by the CCEs. The BS determines a PDCCH format according to a DCI to be transmitted to the UE, and attaches a cyclic redundancy check (CRC) to control information. The CRC is masked with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be masked to the CRC. Alternatively, if the PDCCH is for a paging message, a paging indicator identifier (e.g., paging-RNTI (P-RNTI)) may be masked to the CRC. If the PDCCH is for system information (more specifically, a system information block (SIB) to be described below), a system information identifier and a system information RNTI (SI-RNTI) may be masked to the CRC. To indicate a random access response that is a response for transmission of a random access preamble of the UE, a random access-RNTI (RA-RNTI) may be masked to the CRC.

Figure 5:
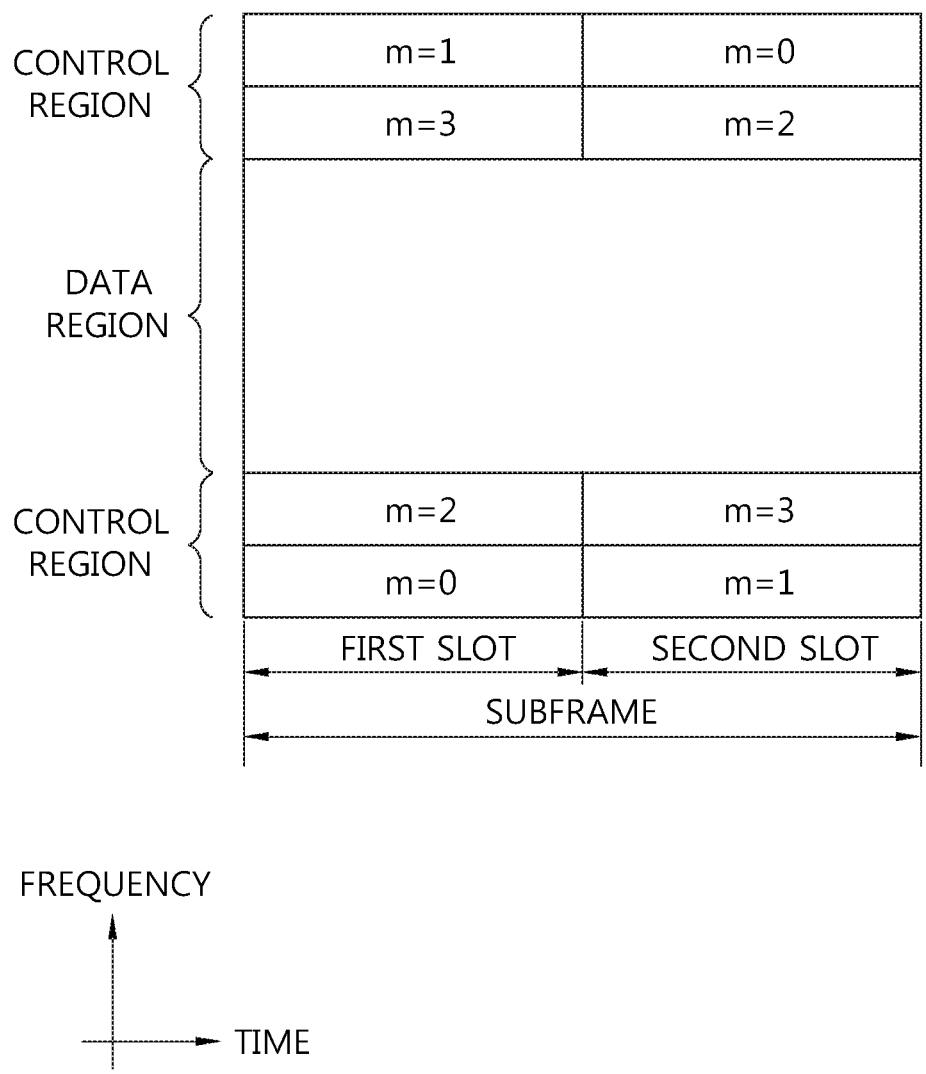
FIG. 5 shows structure of an uplink subframe.

FIG. 5 shows structure of an uplink subframe. Referring to FIG. 5, an uplink subframe can be divided in a frequency domain into a control region and a data region. The control region is allocated with a physical uplink control channel (PUCCH) for carrying uplink control information. The data region is allocated with a physical uplink shared channel (PUSCH) for carrying user data. When indicated by a higher layer, the UE may support a simultaneous transmission of the PUSCH and the PUCCH. The PUCCH for one UE is allocated to an RB pair in a subframe. RBs belonging to the RB pair occupy different subcarriers in respective two slots. This is called that the RB pair allocated to the PUCCH is frequency-hopped in a slot boundary. This is said that the pair of RBs allocated to the PUCCH is frequency-hopped at the slot boundary. The UE can obtain a frequency diversity gain by transmitting uplink control information through different subcarriers according to time.

Uplink control information transmitted on the PUCCH may include a hybrid automatic repeat request (HARQ) acknowledgement/non-acknowledgement (ACK/NACK), a channel quality indicator (CQI) indicating the state of a downlink channel, a scheduling request (SR), and the like.

The PUSCH is mapped to an uplink shared channel (UL-SCH), a transport channel. Uplink data transmitted on the PUSCH may be a transport block, a data block for the UL-SCH transmitted during the TTI. The transport block may be user information. Or, the uplink data may be multiplexed data. The multiplexed data may be data obtained by multiplexing the transport block for the UL-SCH and control information. For example, control information multiplexed to data may include a CQI, a precoding matrix indicator (PMI), an HARQ, a rank indicator (RI), or the like. Or the uplink data may include only control information.

Carrier aggregation (CA) is described. It may be referred to Section 5.5 of 3GPP TS 36.300 V11.6.0 (2013-06).

In CA, two or more component carriers (CCs) are aggregated in order to support wider transmission bandwidths up to 100 MHz or more. A UE may simultaneously receive or transmit on one or multiple CCs depending on its capabilities. A UE with single timing advance capability for CA can simultaneously receive and/or transmit on multiple CCs corresponding to multiple serving cells sharing the same timing advance (multiple serving cells grouped in one timing advance group (TAG)). A UE with multiple timing advance capability for CA can simultaneously receive and/or transmit on multiple CCs corresponding to multiple serving cells with different timing advances (multiple serving cells grouped in multiple TAGs). E-UTRAN ensures that each TAG contains at least one serving cell. A non-CA capable UE can receive on a single CC and transmit on a single CC corresponding to one serving cell only (one serving cell in one TAG).

A serving cell is combination of downlink and optionally uplink resources. That is, a serving cell may consist of one DL CC and one UL CC. Alternatively, a serving cell may consist of one DL CC. CA may have a plurality of serving cells. The plurality of serving cells may consist of one primary serving cell (PCell) and at least one secondary serving cell (SCell). PUCCH transmission, random access procedure, etc., may be performed only in the PCell.

Figure 6:
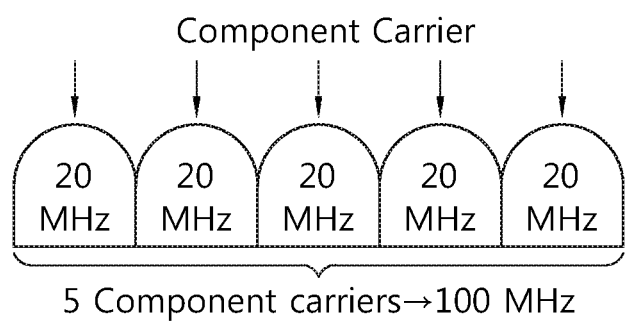
FIG. 6 shows an example of a carrier aggregation of 3GPP LTE-A.

FIG. 6 shows an example of a carrier aggregation of 3GPP LTE-A. Referring to FIG. 6, each CC has a bandwidth of 20 MHz, which is a bandwidth of 3GPP LTE. Up to 5 CCs or more may be aggregated, so maximum bandwidth of 100 MHz or more may be configured.

CA is supported for both contiguous and non-contiguous CCs with each CC limited to a maximum of 110 RBs in the frequency domain using the Rel-8/9 numerology.

It is possible to configure a UE to aggregate a different number of CCs originating from the same eNB and of possibly different bandwidths in the UL and the DL. The number of DL CCs that can be configured depends on the DL aggregation capability of the UE. The number of UL CCs that can be configured depends on the UL aggregation capability of the UE. In typical TDD deployments, the number of CCs and the bandwidth of each CC in UL and DL is the same. A number of TAGs that can be configured depends on the TAG capability of the UE.

CCs originating from the same eNB need not to provide the same coverage.

CCs shall be LTE Rel-8/9 compatible. Nevertheless, existing mechanisms (e.g., barring) may be used to avoid Rel-8/9 UEs to camp on a CC.

The spacing between center frequencies of contiguously aggregated CCs shall be a multiple of 300 kHz. This is in order to be compatible with the 100 kHz frequency raster of Rel-8/9 and at the same time preserve orthogonality of the subcarriers with 15 kHz spacing. Depending on the aggregation scenario, the n×300 kHz spacing can be facilitated by insertion of a low number of unused subcarriers between contiguous CCs.

For TDD CA, the downlink/uplink configuration is identical across component carriers in the same band and may be the same or different across component carriers in different bands.

Dual connectivity is described.

Figure 7:
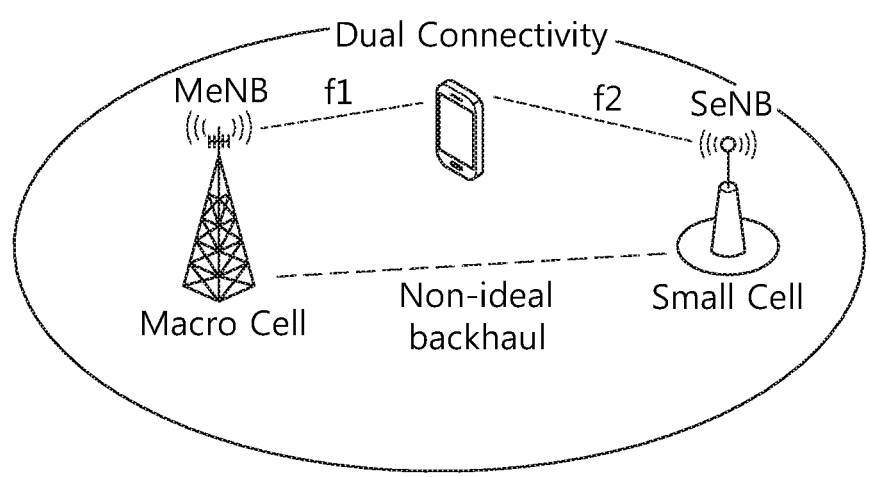
FIG. 7 shows an example of dual connectivity to a macro cell and a small cell.

FIG. 7 shows an example of dual connectivity to a macro cell and a small cell. Referring to FIG. 7, the UE is connected to both the macro cell and the small cell. A macro cell eNB serving the macro cell is the MeNB in dual connectivity, and a small cell eNB serving the small cell is the SeNB in dual connectivity. The MeNB is an eNB which terminates at least S1-MME and therefore act as mobility anchor towards the CN in dual connectivity. If a macro eNB exists, the macro eNB may function as the MeNB, generally.

The SeNB is an eNB providing additional radio resources for the UE, which is not the MeNB, in dual connectivity. The SeNB may be generally configured for transmitting best effort (BE) type traffic, while the MeNB may be generally configured for transmitting other types of traffic such as VoIP, streaming data, or signaling data. The interface between the MeNB and SeNB is called Xn interface. The Xn interface is assumed to be non-ideal, i.e., the delay in Xn interface could be up to 60 ms.

Uplink power control according to the current specification of 3GPP LTE is described. It may be referred to Section of 5.1 of 3GPP TS 36.213 V11.3.0 (2013-06). For PUSCH, the transmit power $P^\wedge_{PUSCH,c}(i)$ is first scaled by the ratio of the number of antennas ports with a non-zero PUSCH transmission to the number of configured antenna ports for the transmission scheme. The resulting scaled power is then split equally across the antenna ports on which the non-zero PUSCH is transmitted. For PUCCH or sounding reference signal (SRS), the transmit power $P^\wedge_{PUSCH,c}(i)$ or $P^\wedge_{SRS,c}(i)$ is split equally across the configured antenna ports for PUCCH or SRS. $P^\wedge_{SRS,c}(i)$ is the linear value of $P_{SRS,c}(i)$.

Uplink power control for the PUSCH is described. The setting of the UE transmit power for a PUSCH transmission is defined as follows. If the UE transmits PUSCH without a simultaneous PUCCH for the serving cell c, then the UE transmit power $P_{PUSCH,c}(i)$ for PUSCH transmission in subframe i for the serving cell c is given by Equation 1.

$$P_{PUSCH,c}(i) = \min \begin{cases} P_{CMAX,c}(i), \\ 10\log_{10}(M_{PUSCH,c}(i)) + P_{O\_PUSCH,c}(j) + \\ \alpha_c(j) \cdot PL_c + \Delta_{TF,c}(i) + f_c(i) \end{cases}$$ ⟨Equation 1⟩

[dBm]

If the UE transmits PUSCH simultaneous with PUCCH for the serving cell c, then the UE transmit power $P_{PUSCH,c}(i)$ for the PUSCH transmission in subframe i for the serving cell c is given by Equation 2.

$$P_{PUSCH,c}(i) = \min \begin{cases} 10\log_{10}(\hat{P}_{CMAX,c}(i) - \hat{P}_{PUCCH}(i)), \\ 10\log_{10}(M_{PUSCH,c}(i)) + P_{O\_PUSCH,c}(j) + \\ \alpha_c(j) \cdot PL_c + \Delta_{TF,c}(i) + f_c(i) \end{cases}$$ ⟨Equation 2⟩

[dBm]

If the UE is not transmitting PUSCH for the serving cell c, for the accumulation of transmit power control (TPC) command received with DCI format 3/3A for PUSCH, the UE shall assume that the UE transmit power $P_{PUSCH,c}(i)$ for the PUSCH transmission in subframe i for the serving cell c is computed by Equation 3.

$$P_{PUSCH,c}(i) = \min\{P_{CMAX,c}(i), P_{O\_PUSCH,c}(1) + \alpha_c(1) \cdot PL_c + f_c(i)\} [dBm]$$ ⟨Equation 3⟩

In equations described above, $P_{CMAX,c}(i)$ is the configured UE transmit power in subframe i for serving cell c and $P^\wedge_{CMAX,c}(i)$ is the linear value of $P_{CMAX,c}(i)$. $P^\wedge_{PUCCH}(i)$ is the linear value of $P_{PUCCH}(i)$ described below. $M_{PUSCH,c}(i)$ is the bandwidth of the PUSCH resource assignment expressed in number of resource blocks valid for subframe i and serving cell c. $P_{O\_PUSCH,c}(j)$ is a parameter composed of the sum of a component $P_{O\_NOMINAL\_PUSCH,c}(j)$ provided from higher layers for j=0 and 1 and a component $P_{O\_UE\_PUSCH,c}(j)$ provided by higher layers for j=0 and 1 for serving cell c. $PL_c$ is the downlink pathloss estimate calculated in the UE for serving cell c in dB and PLc=referenceSignalPower—higher layer filtered reference signal received power (RSRP), where referenceSignalPower is provided by higher layers and RSRP and the higher layer filter configuration are defined for the reference serving cell. If serving cell c belongs to a timing advance group (TAG) containing the primary cell then, for the uplink of the primary cell, the primary cell is used as the reference serving cell for determining referenceSignalPower and higher layer filtered RSRP. For the uplink of the secondary cell, the serving cell configured by the higher layer parameter pathlossReferenceLinking is used as the reference serving cell for determining referenceSignalPower and higher layer filtered RSRP. If serving cell c belongs to a TAG not containing the primary cell then serving cell c is used as the reference serving cell for determining referenceSignalPower and higher layer filtered RSRP.

If the total transmit power of the UE would exceed $P^\wedge_{CMAX}(i)$, the UE scales $P^\wedge_{PUSCH,c}(i)$ for the serving cell c in subframe i such that Equation 4 is satisfied.

$$\sum_c w(i) \cdot \hat{P}_{PUSCH,c}(i) \le (\hat{P}_{CMAX}(i) - \hat{P}_{PUCCH}(i))$$ ⟨Equation 4⟩

In Equation 4, $P^\wedge_{PUCCH}(i)$ is the linear value of $P_{PUCCH}(i)$, $P^\wedge_{PUSCH,c}(i)$ is the linear value of $P_{PUSCH,c}(i)$, $P^\wedge_{CMAX}(i)$ is the linear value of the UE total configured maximum output power $P_{CMAX}$ in subframe i and w(i) is a scaling factor of $P^\wedge_{PUSCH,c}(i)$ for serving cell c where 0≤w(i)≤1. In case there is no PUCCH transmission in subframe i, $P^\wedge_{PUCCH}(i)=0$.

If the UE has PUSCH transmission with uplink control information (UCI) on serving cell j and PUSCH without UCI in any of the remaining serving cells, and the total transmit power of the UE would exceed $P^\wedge_{CMAX}(i)$, the UE scales $P^\wedge_{PUSCH,c}(i)$ for the serving cells without UCI in subframe i such that Equation 5 is satisfied.

$$\sum_{c \ne j} w(i) \cdot \hat{P}_{PUSCH,c}(i) \le (\hat{P}_{CMAX}(i) - \hat{P}_{PUSCH,j}(i))$$ ⟨Equation 5⟩

$P^\wedge_{PUSCH,j}(i)$ is the PUSCH transmit power for the cell with UCI and w(i) is a scaling factor of $P^\wedge_{PUSCH,c}(i)$ for serving cell c without UCI. In this case, no power scaling is applied to $P^\wedge_{PUSCH,j}(i)$ unless $$\sum_{c \ne j} w(i) \cdot \hat{P}_{PUSCH,c}(i) = 0$$

and the total transmit power of the UE still would exceed $P^\wedge_{CMAX}(i)$. Note that w(i) values are the same across serving cells when w(i)>0 but for certain serving cells w(i) may be zero.

If the UE has simultaneous PUCCH and PUSCH transmission with UCI on serving cell j and PUSCH transmission without UCI in any of the remaining serving cells, and the total transmit power of the UE would exceed $P^\wedge_{CMAX}(i)$, the UE obtains $P^\wedge_{PUSCH,c}(i)$ according to Equation 6.

$$\hat{P}_{PUSCH,j}(i) = \min(\hat{P}_{PUSCH,j}(i), (\hat{P}_{CMAX}(i) - \hat{P}_{PUCCH}(i)))$$ ⟨Equation 6⟩

$$\sum_{c \neq j} w(i) \cdot \hat{P}_{PUSCH,c}(i) \leq (\hat{P}_{CMAX}(i) - \hat{P}_{PUCCH}(i) - \hat{P}_{PUSCH,j}(i))$$

If the UE is configured with multiple TAGs, and if the PUCCH/PUSCH transmission of the UE on subframe i for a given serving cell in a TAG overlaps some portion of the first symbol of the PUSCH transmission on subframe i+1 for a different serving cell in another TAG, the UE shall adjust its total transmission power to not exceed $P_{CMAX}$ on any overlapped portion.

If the UE is configured with multiple TAGs, and if the PUSCH transmission of the UE on subframe i for a given serving cell in a TAG overlaps some portion of the first symbol of the PUCCH transmission on subframe i+1 for a different serving cell in another TAG, the UE shall adjust its total transmission power to not exceed $P_{CMAX}$ on any overlapped portion.

If the UE is configured with multiple TAGS, and if the SRS transmission of the UE in a symbol on subframe i for a given serving cell in a TAG overlaps with the PUCCH/PUSCH transmission on subframe I or subframe i+1 for a different serving cell in the same or another TAG, the UE shall drop SRS if its total transmission power exceeds $P_{CMAX}$ on any overlapped portion of the symbol.

If the UE is configured with multiple TAGs and more than 2 serving cells, and if the SRS transmission of the UE in a symbol on subframe i for a given serving cell overlaps with the SRS transmission on subframe i for a different serving cell(s) and with PUSCH/PUCCH transmission on subframe i or subframe i+1 for another serving cell(s), the UE shall drop the SRS transmissions if the total transmission power exceeds $P_{CMAX}$ on any overlapped portion of the symbol.

If the UE is configured with multiple TAGs, the UE shall, when requested by higher layers, to transmit physical random access channel (PRACH) in a secondary serving cell in parallel with SRS transmission in a symbol on a subframe of a different serving cell belonging to a different TAG, drop SRS if the total transmission power exceeds $P_{CMAX}$ on any overlapped portion in the symbol.

If the UE is configured with multiple TAGs, the UE shall, when requested by higher layers, to transmit PRACH in a secondary serving cell in parallel with PUSCH/PUCCH in a different serving cell belonging to a different TAG, adjust the transmission power of PUSCH/PUCCH so that its total transmission power does not exceed $P_{CMAX}$ on the overlapped portion.

Uplink power control for the PUCCH is described. If serving cell c is the primary cell, the setting of the UE transmit power $P_{PUCCH}$ for the PUCCH transmission in subframe i is defined by Equation 7.

$$P_{PUCCH}(i) = \min \begin{Bmatrix} P_{CMAX,c}(i), \\ P_{0\_PUCCH} + PL_c + h(n_{CQI}, n_{HARQ}, n_{SR}) + \\ \Delta_{F\_PUCCH}(F) + \Delta_{TxD}(F') + g(i) \end{Bmatrix}$$ ⟨Equation 7⟩

[dBm]

If the UE is not transmitting PUCCH for the primary cell, for the accumulation of TPC command received with DCI format 3/3A for PUCCH, the UE shall assume that the UE transmit power $P_{PUCCH}$ for the PUCCH transmission in subframe i is computed by Equation 8.

$$P_{PUCCH}(i) = \min\{P_{CMAX,c}(i), P_{0\_PUCCH} + PL_c + g(i)\}_{[dBm]}$$ ⟨Equation 8⟩

In equations described above, $P_{CMAX,c}(i)$ is the configured UE transmit power in subframe i for serving cell c. The parameter $\Delta_{F\_PUCCH}(F)$ is provided by higher layers. If the UE is configured by higher layers to transmit PUCCH on two antenna ports, the value of $\Delta_{TxD}(F')$ is provided by higher layers. Otherwise, $\Delta_{TxD}(F')=0$. $h(n_{CQI}, n_{HARQ}, n_{SR})$ is a PUCCH format dependent value, where $n_{CQI}$ corresponds to the number of information bits for the channel quality information (CQI). $n_{SR}=1$ if subframe i is configured for SR for the UE not having any associated transport block for UL-SCH, otherwise $n_{SR}=0=0$. $P_{O\_PUCCH}$ is a parameter composed of the sum of a parameter $P_{O\_NOMINAL\_PUCCH}$ provided by higher layers and a parameter $P_{O\_UE\_PUCCH}$ provided by higher layers.

Hereinafter, a method for controlling uplink power according to embodiments of the present invention is described. An embodiment of the present invention may propose power control aspects when inter-site carrier aggregation is used for a UE. Inter-site carrier aggregation may be defined as that a UE is configured with multiple carriers where at least two carriers are associated with separate eNBs which may be connected by ideal backhaul or non-ideal backhaul. When a UE can perform simultaneous two UL transmissions (including PUSCH/PUCCH), the following cases may be considered.

Case 1: FDD+FDD or same DL/UL configuration TDD+TDD over idea backhaul
Case 2: FDD+FDD or same DL/UL configuration TDD+TDD over non-idea backhaul
Case 3: FDD+TDD or different DL/UL configuration TDD+TDD over ideal backhaul
Case 4: FDD+TDD or different DL/UL configuration TDD+TDD over non-ideal backhaul When a UE cannot be able to perform simultaneous two UL transmissions, the following cases may be considered.

Case 5: FDD+FDD or same DL/UL configuration TDD+TDD over idea backhaul
Case 6: FDD+FDD or same DL/UL configuration TDD+TDD over non-idea backhaul
Case 7: FDD+TDD or different DL/UL configuration TDD+TDD over ideal backhaul
Case 8: FDD+TDD or different DL/UL configuration TDD+TDD over non-ideal backhaul Hereinafter, for the convenience, a case where more than one carrier group is configured by a single eNB where each carrier group may have a carrier receiving PUCCH is called "PUCCH offloading". Each carrier group may have multiple carriers, even though the number of PUCCH carrier may be limited to only one per carrier group. The embodiment of the present invention describe below may be applied to a case of PUCCH offloading.

Uplink power control for FDD/TDD aggregation or different DL/UL TDD configuration is described. This may correspond to cases 3, 4, 7, and 8 described above.

Figure 8:
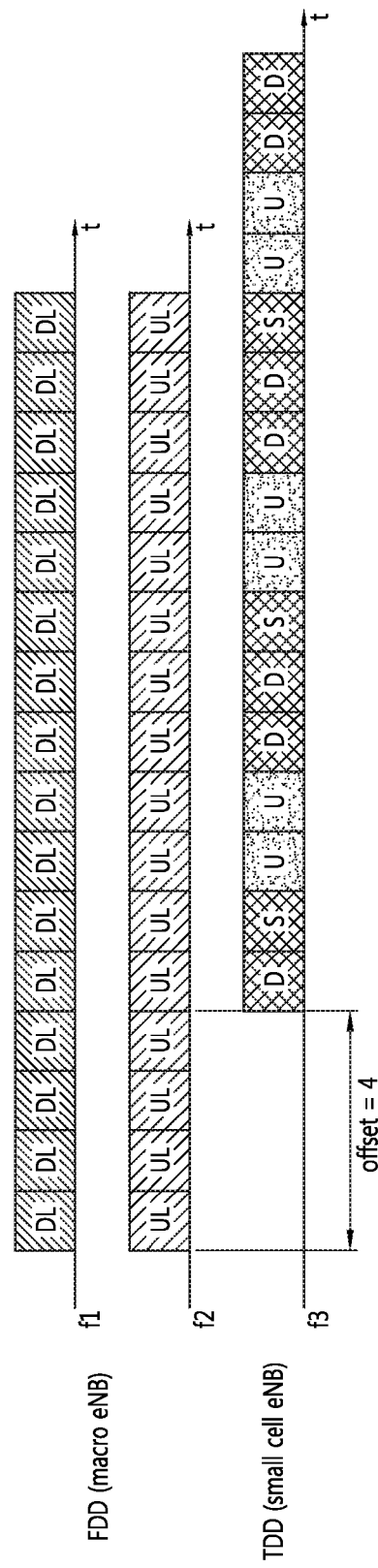
FIG. 8 shows an example of a system frame number (SFN) boundary misalignment or slot/subframe number misalignment.

FIG. 8 shows an example of a system frame number (SFN) boundary misalignment or slot/subframe number misalignment. When FDD and TDD carriers between two eNBs are aggregated or different DL/UL TDD carriers are aggregated, by the configuration, there are a set of subframes where the UE transmits any uplink signal to only one eNB.

For example, referring to FIG. 8, if two eNBs have single CC respectively and the macro eNB employs FDD and the small cell eNB employs TDD DL/UL configuration 1 and the time synchronization between two eNBs are aligned, then the UE may assume that at least at subframe #0, #4, #5, #9, only one uplink transmission to the macro eNB will be occurred, whereas potentially two uplink transmissions may be occurred to the two eNBs simultaneously at other subframes. A set of UL subframes where only one eNB may be the uplink recipient (e.g., subframe #0, #4, #5, #9) may be called "HI_UL" and other UL subframes where potentially two eNBs may be uplink recipients (e.g., subframe #2, #3, #7, #8, (#1, #6)) may be called "LO_UL" per each eNB. When each eNB has more than one CC, HI_UL may include a UL subframe where at least one CC within the eNB has uplink subframe configured and other eNB does not have any UL subframe configured in the same subframe. It may also be applied to LO_UL set as well.

To effectively utilize this aspect, two $P_{CMAX,eNBj}$ values used in HI_UL ($P_{CMAX,eNBj,2}$) and LO_UL ($P_{CMAX,eNBj,1}$) may be given respectively. For example, referring to FIG. 8, $P_{CMAX,eNBj,1}$ may be used in subframe #6, #7, #1, #2 and $P_{CMAX,eNBj,2}$ may be used in other subframes. In FDD UL subframe colliding with special subframe of TDD carrier, it may be assumed that $P_{CMAX,eNBj,2}$ is used. However, if SRS transmission may occur frequently at special subframes, it may be assumed that $P_{CMAX,eNBj,1}$ is used. The bitmap indicating where $P_{CMAX,eNBj,2}$ is used may be higher-layer signaled. To support this, when inter-site CA is used, either eNBs may perform network synchronization or discovery to find out the offset of subframe boundary or the UE may inform the offset between two carriers. The motivation of this approach is to allow the UE to use higher UL TX power when SCell employing TDD will not transmit any data and the UE to use a bit lower UL TX power when SCell employing TDD may transmit data. Another potential motivation is to keep the difference of two UL transmission power to different eNBs within a range. For example, if UL TX power to small cell is very small, UL TX power to macro cell (when transmitted simultaneously) may not exceed a certain threshold. Thus, $P_{CMAX}$ for PCell may be limited in subframes where potentially simultaneous uplink transmissions to different eNBs may be occurred. In terms of realizing this motivation, a few alternative approaches may be feasible as follows.

(1) Configuration of two $P_{CMAX,eNBj}$: As explained above, two $P_{CMAX}$ values may be configured to be utilized in each set (with the other eNB UL and without the other eNB UL)

(2) Change of power control equation: The setting of the UE transmit power for a PUSCH transmission is defined as follows. This may be change of Equation 1 to Equation according to an embodiment of the present invention.

The same technique may be applied for the minimum reserved power allocation per each carrier group where two different minimum reserved powers may be configured per different sets of subframes for each carrier group. One example is to allow high minimum reserved power for the first set of subframes configured for eIMTA operation and allow low minimum reserved power for the second set of subframes configured for eIMTA operation.

If the UE transmits PUSCH for the serving cell c without PUCCH or PUSCH transmission to other serving cell and without a simultaneous PUCCH for the serving cell c, then the UE transmit power $P_{PUSCH,c}(i)$ for PUSCH transmission in subframe i for the serving cell c is given by Equation 9.

$$P_{PUSCH,c}(i) = \min \begin{cases} P_{CMAX,c}(i), \\ 10\log_{10}(M_{PUSCH,c}(i)) + P_{O\_PUSCH,c}(j) + \\ \alpha_c(j) \cdot PL_c + \Delta_{TF,c}(i) + f_c(i) \end{cases}$$ ⟨Equation 9⟩

[dBm]

The UE may be configured with "power adaptation CC"=xCell where UL power of xCell will be lowered if other CCs are transmitting at the same time. For example, xCell may be PCell or SCell.

If the UE transmits PUSCH for the serving cell c, where serving cell c is xCell, with PUCCH or PUSCH transmission to other serving cell and without a simultaneous PUCCH for the serving cell c, then the UE transmit power $P_{PUSCH,c}(i)$ for the PUSCH transmission in subframe i for the serving cell c is given by Equation 10.

$$P_{PUSCH,c}(i) = \min \begin{cases} 10\log_{10}(\hat{P}_{CMAX,c}(i) - P_{UL,other\ CC}(i)), \\ 10\log_{10}(M_{PUSCH,c}(i)) + P_{O\_PUSCH,c}(j) + \\ \alpha_c(j) \cdot PL_c + \Delta_{TF,c}(i) + f_c(i) \end{cases}$$ ⟨Equation 10⟩

[dBm]

In Equation 10, $P_{UL,otherCC}(i)$ is the summation of uplink power assigned to other CCs.

If the UE transmits PUSCH for the serving cell c, where serving cell c is xCell, without PUCCH or PUSCH transmission to other serving cell and with a simultaneous PUCCH for the serving cell c, then the UE transmit power $P_{PUSCH,c}(i)$ for the PUSCH transmission in subframe i for the serving cell c is given by Equation 11.

$$P_{PUSCH,c}(i) = \min \begin{cases} 10\log_{10}(\hat{P}_{CMAX,c}(i) - \hat{P}_{PUCCH}(i)), \\ 10\log_{10}(M_{PUSCH,c}(i)) + P_{O\_PUSCH,c}(j) + \\ \alpha_c(j) \cdot PL_c + \Delta_{TF,c}(i) + f_c(i) \end{cases}$$ ⟨Equation 11⟩

[dBm]

If the UE transmits PUSCH for the serving cell c, where serving cell c is xCell, with PUCCH or PUSCH transmission to other serving cell and with a simultaneous PUCCH for the serving cell c, then the UE transmit power $P_{PUSCH,c}(i)$ for the PUSCH transmission in subframe i for the serving cell c is given by Equation 12.

$$P_{PUSCH,c}(i) = \min \begin{cases} 10\log_{10}(\hat{P}_{CMAX,c}(i) - \hat{P}_{UL,other\ CC}(i) - \hat{P}_{PUCCH}(i)), \\ 10\log_{10}(M_{PUSCH,c}(i)) + P_{O\_PUSCH,c}(j) + \\ \alpha_c(j) \cdot PL_c + \Delta_{TF,c}(i) + f_c(i) \end{cases}$$ ⟨Equation 12⟩

[dBm]

This may be expanded to UL transmission between two eNBs only. If it is expanded, then the setting of the UE transmit power for a PUSCH transmission is defined as follows.

If the UE transmits PUSCH for the serving cell c of eNBj without PUCCH or PUSCH transmission to the other eNB and without a simultaneous PUCCH for the serving cell c, then the UE transmit power $P_{PUSCH,c}(i)$ for PUSCH transmission in subframe i for the serving cell c is given by Equation 13.

$$P_{PUSCH,eNBj,c}(i) = \qquad \langle\text{Equation 13}\rangle$$

$$\min\begin{Bmatrix} P_{CMAX,eNBj,c}(i), \\ 10\log_{10}(M_{PUSCH,c}(i)) + P_{O\_PUSCH,c}(j) + \\ \alpha_c(j) \cdot PL_c + \Delta_{TF,c}(i) + f_c(i) \end{Bmatrix}$$

[dBm]

If the UE transmits PUSCH for the serving cell c of eNBj with PUCCH or PUSCH transmission to the other eNB and without a simultaneous PUCCH for the serving cell c, then the UE transmit power $P_{PUSCH,c}(i)$ for the PUSCH transmission in subframe i for the serving cell c is given by Equation 14.

$$P_{PUSCH,eNBj,c}(i) = \qquad \langle\text{Equation 14}\rangle$$

$$\min\begin{Bmatrix} 10\log_{10}(\hat{P}_{CMAX,eNBj,c}(i) - \hat{P}_{CMAX,eNB|1-j|}(i)), \\ 10\log_{10}(M_{PUSCH,c}(i)) + P_{O\_PUSCH,c}(j) + \\ \alpha_c(j) \cdot PL_c + \Delta_{TF,c}(i) + f_c(i) \end{Bmatrix}$$

[dBm]

In Equation 14, $\hat{P}_{CMAX,eNB|1-j|}(i)$ is the configured maximum power for the other eNB UL transmission.

If the UE transmits PUSCH for the serving cell c of eNBj without PUCCH or PUSCH transmission to other serving cell and with a simultaneous PUCCH for the serving cell c, then the UE transmit power $P_{PUSCH,c}(i)$ for the PUSCH transmission in subframe i for the serving cell c is given by Equation 15.

$$P_{PUSCH,eNBj,c}(i) = \qquad \langle\text{Equation 15}\rangle$$

$$\min\begin{Bmatrix} 10\log_{10}(\hat{P}_{CMAX,eNBj,c}(i) - \hat{P}_{PUCCH,eNBj}(i)), \\ 10\log_{10}(M_{PUSCH,c}(i)) + P_{O\_PUSCH,c}(j) + \\ \alpha_c(j) \cdot PL_c + \Delta_{TF,c}(i) + f_c(i) \end{Bmatrix}$$

[dBm]

If the UE transmits PUSCH for the serving cell c, where serving cell c is xCell, with PUCCH or PUSCH transmission to other serving cell and with a simultaneous PUCCH for the serving cell c, then the UE transmit power $P_{PUSCH,c}(i)$ for the PUSCH transmission in subframe i for the serving cell c is given by Equation 16.

$$P_{PUSCH,eNBj,c}(i) = \qquad \langle\text{Equation 16}\rangle$$

$$\min\begin{Bmatrix} 10\log_{10}(\hat{P}_{CMAX,eNBj,c}(i) - \hat{P}_{CMAX,eNB|1-j|}(i) - \\ \hat{P}_{PUCCH,eNBj}(i)), \\ 10\log_{10}(M_{PUSCH,c}(i)) + P_{O\_PUSCH,c}(j) + \\ \alpha_c(j) \cdot PL_c + \Delta_{TF,c}(i) + f_c(i) \end{Bmatrix}$$

[dBm]

Actual equation calculating UE transmit power for PUSCH transmission may be slightly different from Equation 9 to 16 described above. The idea is to reduce the maximum power of uplink signal transmission if there is potential uplink transmission to the other eNB. Assuming the other eNB is a small cell, the configured maximum power for the small cell may be quite small. Thus, this invention assumes conservative power control. However, some other values (or scaled-down values) may be used to reduce the UL signal in the presence of simultaneous uplink transmission to two eNBs (potential). More specifically, eNBj may be limited only to macro cell (or higher maximum UL power configured eNB). In other words, only CCs served by PCell or C-plane cell may consider UL power for small cell or SCell.

(3) Use of scaling factor ρ with $P_{CMAX,c}$: For example, $P_{CMAX,c}(i)$ may be as it is in only one UL subframe among configured CCs and $P_{CMAX,c}(i)$ may be scaled down to $\rho \times P_{CMAX,c}(i)$ in more than one UL subframes among configured CCs. For example, ρ=0.8. This may be expanded to UL transmission between two eNBs only. In this case, $P_{CMAX,eNBj}(i)$ may be as it is where single UL recipient eNB is expected and $P_{CMAX,eNBj}(i)$ may be scaled down to $\rho \times P_{CMAX,eNBj}(i)$ where more than one UL recipient eNBs are expected. Alternatively, $P_{CMAX,eNBj}(i)=P_{CMAX}$ where single UL recipient eNB is expected and $P_{CMAX,eNBj}(i)=\rho \times P_{CMAX}$ where more than one UL recipient eNBs are expected. ρ may be configured per each eNB or calculated per each eNB.

Similarly, $P_{CMAX,c}$ is used in HI_UL subframes whereas configured power such as $P_{alloc,xeNB}$ is used as a guideline for LO_UL. In other words, unused power may be applied to one eNB if the other eNB does not have any uplink transmission because of DL/UL configuration, discontinuous reception (DRX) configuration, deactivation, enhanced interference mitigation & traffic adaptation (eIMTA), etc.

Uplink power limitation when asynchronous carriers are aggregated is described.

Figure 9:
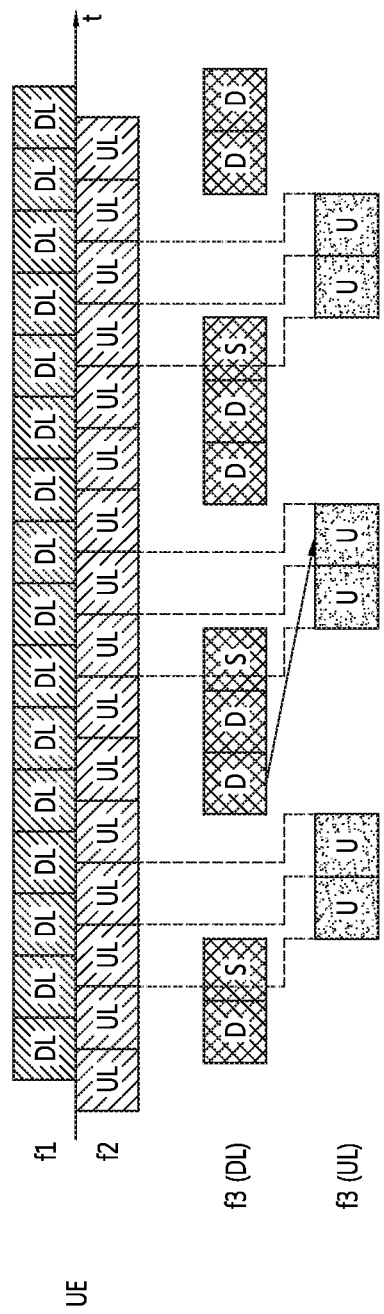
FIG. 9 shows an example of asynchronous UL transmission.

FIG. 9 shows an example of asynchronous UL transmission. Like an example described in FIG. 9, there may be cases where two eNBs are not aligned so that UL transmissions of the UE are not aligned. In terms of handling $P_{CMAX}$, this case may need to be handled properly. Specially, when two $P_{CMAX}$ values are configured for each eNB to utilize single and dual UL transmission subframes, how to apply those values should be also clarified.

Figure 10:
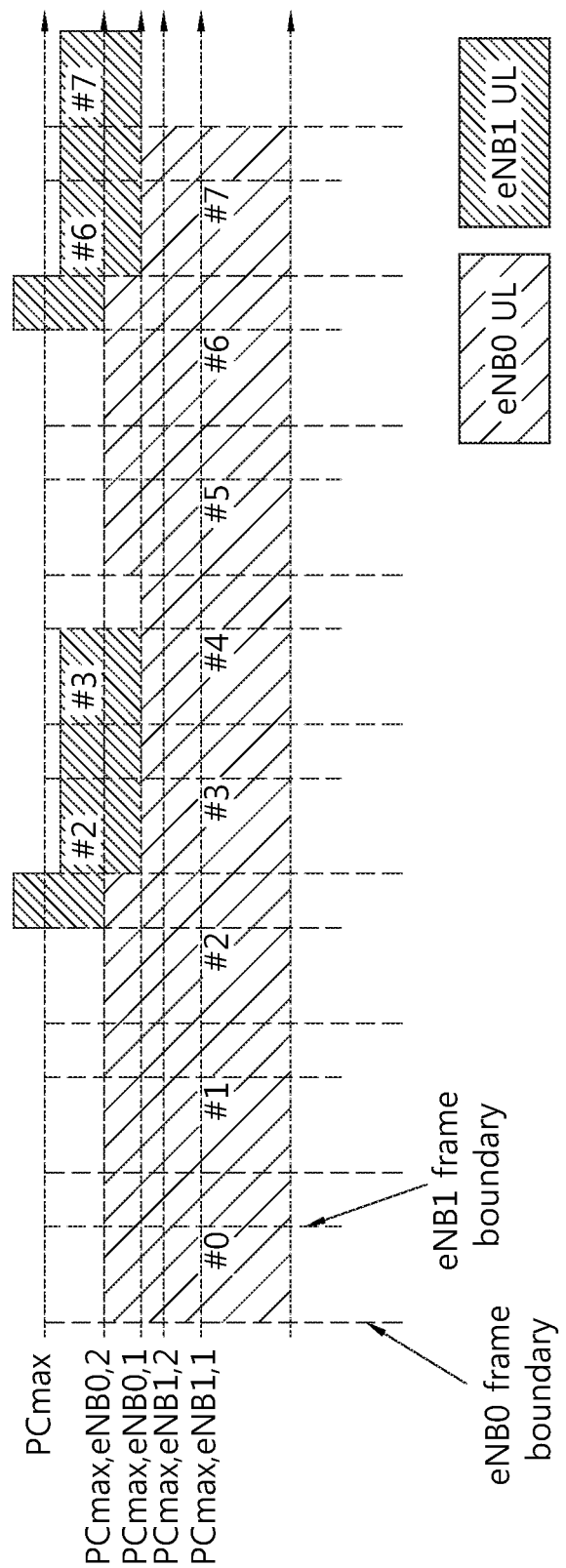
FIG. 10 shows an example of a method for controlling an uplink power according to an embodiment of the present invention.

FIG. 10 shows an example of a method for controlling an uplink power according to an embodiment of the present invention. One approach according to this embodiment of the present invention is based on subframe index to determine HI_UL subframes. In this case, only subframes with the same subframe index (with/without subframe offset) in different eNB having uplink subframe may be considered as LO_UL subframes. That is, in this approach, partial overlap is not considered when applying HI_UL power.

Figure 11:
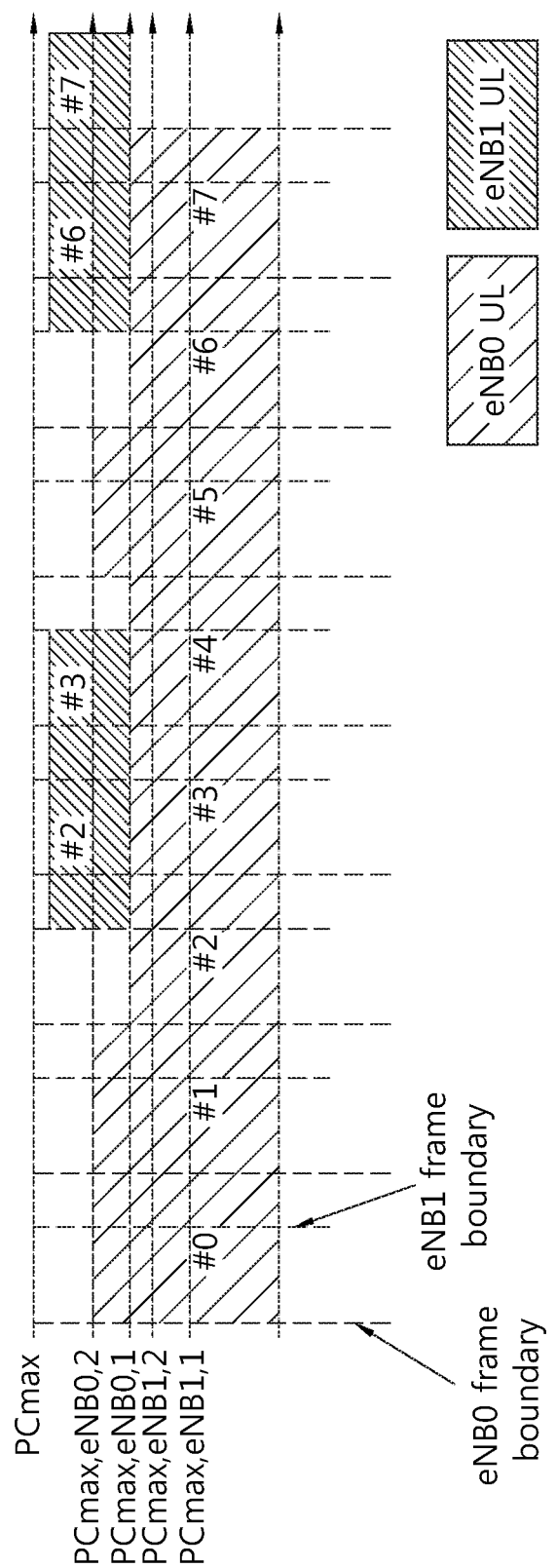
FIG. 11 shows another example of a method for controlling an uplink power according to an embodiment of the present invention.

FIG. 11 shows another example of a method for controlling an uplink power according to an embodiment of the present invention. The other approach according to this embodiment of the present invention is that a UL subframe which has any overlap with UL subframe in different eNB may be considered as LO_UL subframes. The low maximum power may be applied to LO_UL subframes assuming potential two uplink transmissions. That is, in this approach, partial overlap is considered when applying HI_UL power.

Each approach has its own drawbacks and advantages. If the first approach is used, additional power scaling may be necessary. Thus, the first approach may be used when the UE is configured with power scaling or use power scaling when two ULs for two eNBs collide with each other. The Second approach may not achieve the full power in some cases, particularly, when the number of partial overlapped subframes is large. Yet, it is simple approach to avoid potential power scaling or drop case to be occurred.

Thus, when asynchronous CCs are aggregated within one eNB, since the UE may use power scaling to handle power limited cases, the first approach may be used. If dropping mechanism is used between two eNBs to handle power limited case, the second approach may be considered.

The proposed concept described above may be applied to generic dual connectivity scenario with subsets of subframes. That is, the proposed concept described above may be applied to a case in which more than one subset of subframes are configured where maximum uplink power may be configured differently. One example is that when a UE is dual-connected to the macro and small cell where the small cell performs eIMTA and thus configure two uplink power loops, then maximum power usable in macro cell may change per subframe depending on the uplink power control set. This concept may be applied to those generic cases without loss of generality. Per two different subsets of subframes, different maximum power values and/or power configuration may be configured. In this case, the UE may not assume that in HI_UL subframes, there is no uplink transmission to the other eNB. Instead, either lower power may be used compared to LO_UL subframes. Thus, the UE may use higher power in HI_UL subframes to the target eNB. HI_UL and LO_UL may be configured for each eNB or carrier group. Or, one configuration may be shared where the configuration is applied to the carrier group containing PCell.

According to current power control procedure, in most cases, a UE may be able to handle simultaneous transmissions to more than one eNBs without power limitation. Particularly, for a dual connectivity scenario where high power uplink and relatively low power uplink connection to macro and small cell are managed, the summation of two powers may not exceed UE maximum power if uplink power setting for macro cell is not great because of low power for small cell. However, a UE may be a bit far from the macro cell, and accordingly, uplink power for macro cell may be high. To protect transmissions to small cell, multiple approaches may be considered as follows.

(1) Semi-static configuration of HI power and/or LO power subframes for either eNB or both eNBs: One example is to configure different uplink subframe sets where different maximum power may be configured for each eNB.

Figure 12:
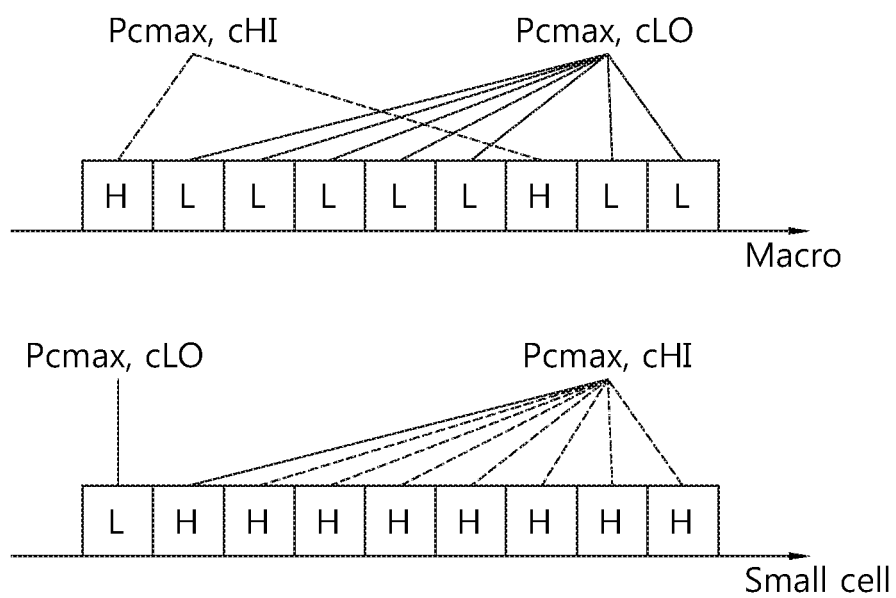
FIG. 12 shows an example of configuring different uplink subframe sets and different maximum power for each eNB according to an embodiment of the present invention.

FIG. 12 shows an example of configuring different uplink subframe sets and different maximum power for each eNB according to an embodiment of the present invention. Here, instead of configuring different PCMAX,c, different parameters such as P0 and/or α may be considered which are used in eIMTA setup or inter-cell interference coordination (ICIC) setup. In other words, via coordination between two eNBs, power may be unevenly prioritized in different subframes.

(2) Power scaling in macro cell only: When power limitation occurs, power scaling or uplink transmission drop map happen only in macro cell so that small cell transmission can be protected. Alternatively, power scaling in non-C-plane cell may be also considered.

(3) PHR triggering: Another approach is to reflect transmission power to other eNB(s) or carrier(s) when power limitation occurs. In that case, PHR may be triggered and reported with the updates in consideration of transmission power to other eNB(s) or carrier(s).

HI power described above may be same as $P_{CMAX,c}$ if not configured. The UE may be configured with $P_{CMAX,cLO}$ which may be used only in subframes with lower power (or power sharing) whereas high power or $P_{CMAX,c}$ may be used in other subframes. Furthermore, LO power and HI power may be configured per carrier group rather than per carrier. In that case, per subframe set, maximum allocated power for each carrier group may be different. Further, depending on power budget per 1 ms boundary, the UE may determine the power limited or not with consideration of overlap with other uplink transmissions.

Power split over time-domain is described. To allow the UE to maximize the usage of power, splitting uplink subframes for PUCCH transmission between MeNB and SeNB may be considered. For example, if FDD and TDD are aggregated, a reference downlink HARQ configuration may be given to the UE for the MeNB such that the UE will report HARQ-ACK in a given subframe. However, HARQ-ACK timing may follow FDD/TDD carrier aggregation mechanism such that if a DL HARQ reference configuration is configuration #0, for instance, a new timing with configuration #0 to support FDD/TDD CA may be utilized for that matter. A key point here is to allow configuring TDD DL/UL reference configuration to handle HARQ-ACK for PUCCH transmission. For PUSCH, it would be handled by scheduling where power scaling on PUCCH should not be occurred for both the MeNB and SeNB. If there is a DL subframe which may not be addressed by a reference configuration, it may be assumed that the UE may skip reporting HARQ-ACK on that subframe even when the UE can successfully decode the data.

For FDD/FDD inter-node resource aggregation, a reference TDD HARQ-ACK configuration may be given to each eNB. An offset may be used such that alignment between uplinks (or overlap between PUCCH subframes) will be minimized or removed. For example, configuration #0 and #1 with offset 3 may be used between the MeNB and SeNB to avoid the overlap for PUCCH transmission. This may be used also for PRACH transmission.

For TDD/TDD inter-node resource aggregation, since dividing uplink would be challenging, it may be considered to give downlink HARQ timing to the SeNB with offset. The SeNB may use different offset if feasible. Otherwise, the UE may be configured with power split or other mechanism.

When a DL HARQ-ACK reference configuration is configured to the UE, there may be RRC ambiguity which will be handled by eNB scheduling restriction. When reference configuration is given to the MeNB, a reference configuration may be given to the SeNB (at SeNB addition/configuration step) along with potential offset (subframe shift).

To consider asynchronous network, the UE may report a set of feasible PUCCH subframe configuration to the network so that the network can properly reconfigure HARQ-ACK timing as well. For example, if the SeNB has TDD configuration #0, the UE may report configuration #1 (with offset) to the MeNB as a recommended HARQ-ACK timing.

This may be applied only when the UE experiences frequent power limited case. Or, the UE may request the network to assign reference DL HARQ timing or configure separate power per carrier group when power limited case occurs frequently. This may be realized by indication of power limited case events.

Autonomous UE power selection is described. When a UE autonomously selects power for each eNB, it would be desirable to report PHR (upon changing the power). In other words, when the power split between two eNB changes, the PHR may be triggered and reported. This may be triggered by change of pathloss. When the UE calculates the maximum power per carrier group, it may use both the number of configured carriers (with uplink) and pathloss. For example, the uplink power may be configured such that "power used for successful PRACH transmission"+margin. The margin may be given or configured by the network. In other words, the maximum allowable margin may be configured by the network where the network will perform the power control in that margin window. Based on that, the UE may report the PHR to each eNB. Instead of network configuring margin, the UE may determine the margin for each carrier group and report the values to the network as well.

When the UE assigns the margin to each eNB, a few rules may be considered. One is to assign sufficient (or fixed) margin (assuming the minimum margin is configured to the UE or preconfigured) to the MeNB and use the rest (which changes dynamically depending on pathloss) which will be reported to each eNB via PHR. Another approach is to split total margin equally (or with scaling factor) between two eNBs. Considering different UL configuration between the MeNB and SeNB, two margin values per HI and LO set may be also considered where PHR reporting may include both values. If the UE determines the margin, message 3 (Msg3) may include the PHR reporting. In other words, the PHR can be triggered at Msg3 transmission such that the computed maximum value may be reported to both eNB. If there is no uplink available in either eNB, the next available uplink may be used to report PHR respectively. In other words, PHR triggering for each eNB may be independent.

In this case, it is possible that the UE may have configured power for PUSCH and/or PUCCH from the MeNB which may exceed the power allocated to the MeNB when the SeNB addition occurs. In that case, the MeNB uses PHR values to determine the situation changes and configure the power properly. In that case, the UE may reset the accumulated power for each carrier aligned with a new determined $P_{CMAX,c}$. In other words, if $P_{CMAX,c}$=min $\{P_{CMAX,eNBj}, P_{CMAX,c}\}$ at eNBi carrier, and when the SeNB addition occurs or a new carrier is configured/activated, the UE may determine $P_{CMAX,eNBj}$ again and reports PHR to each eNB. Then, $P_{CMAX,c}$ may be recalculated. If any power $P_{PUSCH}$ or $P_{PUCCH}$ or $P_{SRS}$ exceeds $P_{CMAX,c}$, it may be reset to $P_{CMAX,c}$. It may be informed to the network where the maximum power for each channel has been changed.

To trigger PHR, a physical layer may signal higher layer about power setting change or pathloss change so that PHR can be triggered properly.

Figure 13:
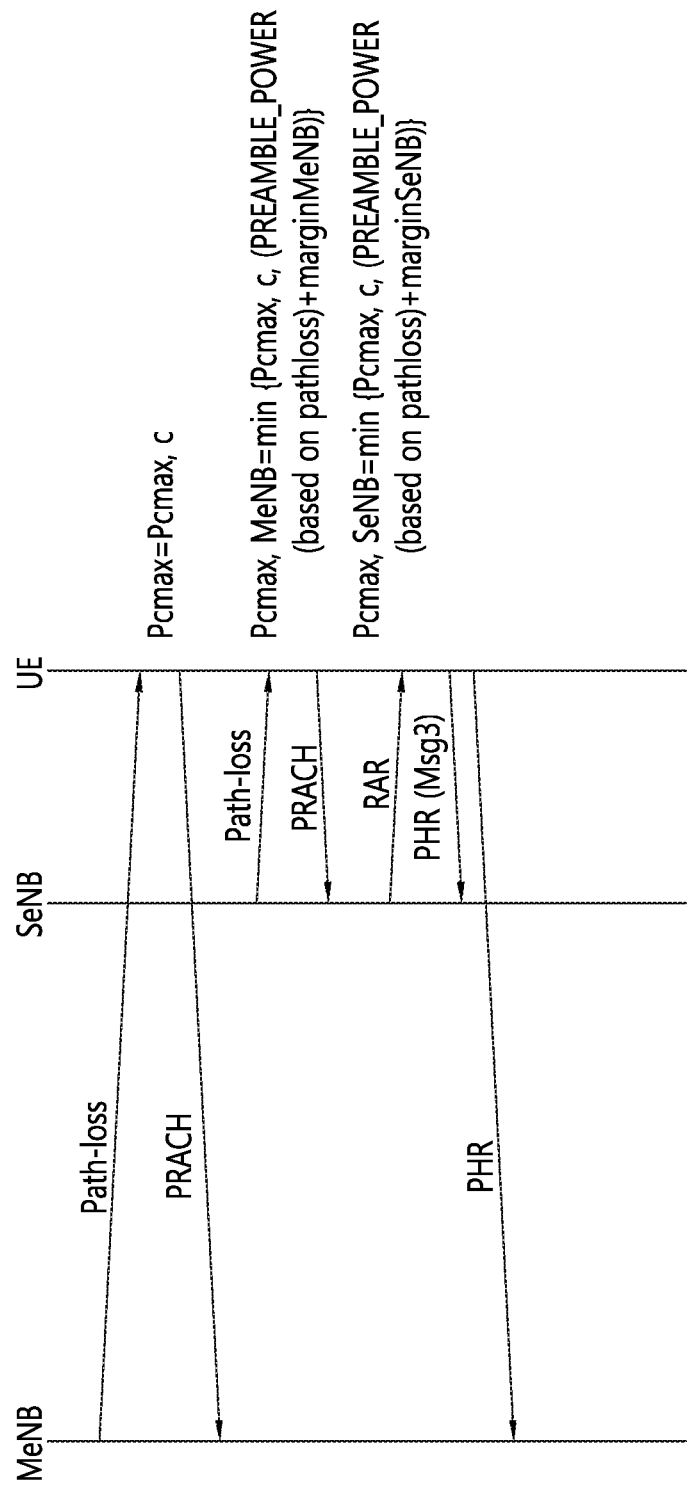
FIG. 13 shows another example of a method for controlling an uplink power according to an embodiment of the present invention.

FIG. 13 shows another example of a method for controlling an uplink power according to an embodiment of the present invention. The MeNB transmits a change of pathloss to the UE, and the UE performs PRACH transmission to the MeNB. Similarly, the SeNB transmits a change of pathloss to the UE, and the UE performs PRACH transmission to the SeNB. In this case, $P_{CMAX}$ may be determined as $P_{CMAX,c}$. The SeNB transmits a random access response (RAR) to the UE. The UE transmits a Msg3 together with the PHR to the SeNB. In this case, $P_{CMAX,SeNB}$ may be determined as min $\{P_{CMAX,c}$, PREAMBLE_POWER (based on pathloss)+marginSeNB$\}$. The UE transmits a PHR to the MeNB. In this case, $P_{CMAX,MeNB}$ may be determined as min $\{P_{CMAX,c}$, PREAMBLE_POWER (based on pathloss)+marginMeNB$\}$.

To allow keeping the same coverage to the MeNB, it may be considered to limit the power usable for SeNB PRACH transmission such that it shall not exceed PCMAX-$P_{CMAX,MeNB}$. In terms of determining $P_{CMAX,MeNB}$, a few approaches may be considered.

(1) $P_{CMAX,MeNB}=P_{PUCCH,c}(i)$ at subframe (2) $P_{CMAX,MeNB}$ may be higher layer configured or calculated using higher layer configuration. For example, if power partitioning is 80%/20% between two eNBs, $P_{CMAX,MeNB}=80\% \times P_{CMAX}$.

(3) If PUCCH/PUSCH simultaneous transmission is configured, $P_{CMAX,MeNB}=P_{PUCCH,c}(i)+P_{PUSCH,c}(i)$ (4) $P_{CMAX,MeNB}$=preambleInitialReceivedTargetPower+DELTA_PREAMBLE+margin where margin is configured by higher layer or predetermined or the UE autonomously selected.

Due to power limit, if PRACH fails, the UE may not be configured with the SeNB and be reported to the eNB. Similar procedure may be applied whenever additional carrier with UL is activated.

Similarly, when the SeNB is de-configured, the PHR may be triggered and be reported back to the MeNB. This may be applied to a carrier deactivation (when the carrier has UL).

Uplink transmission power control at special subframe is described.

Figure 14:
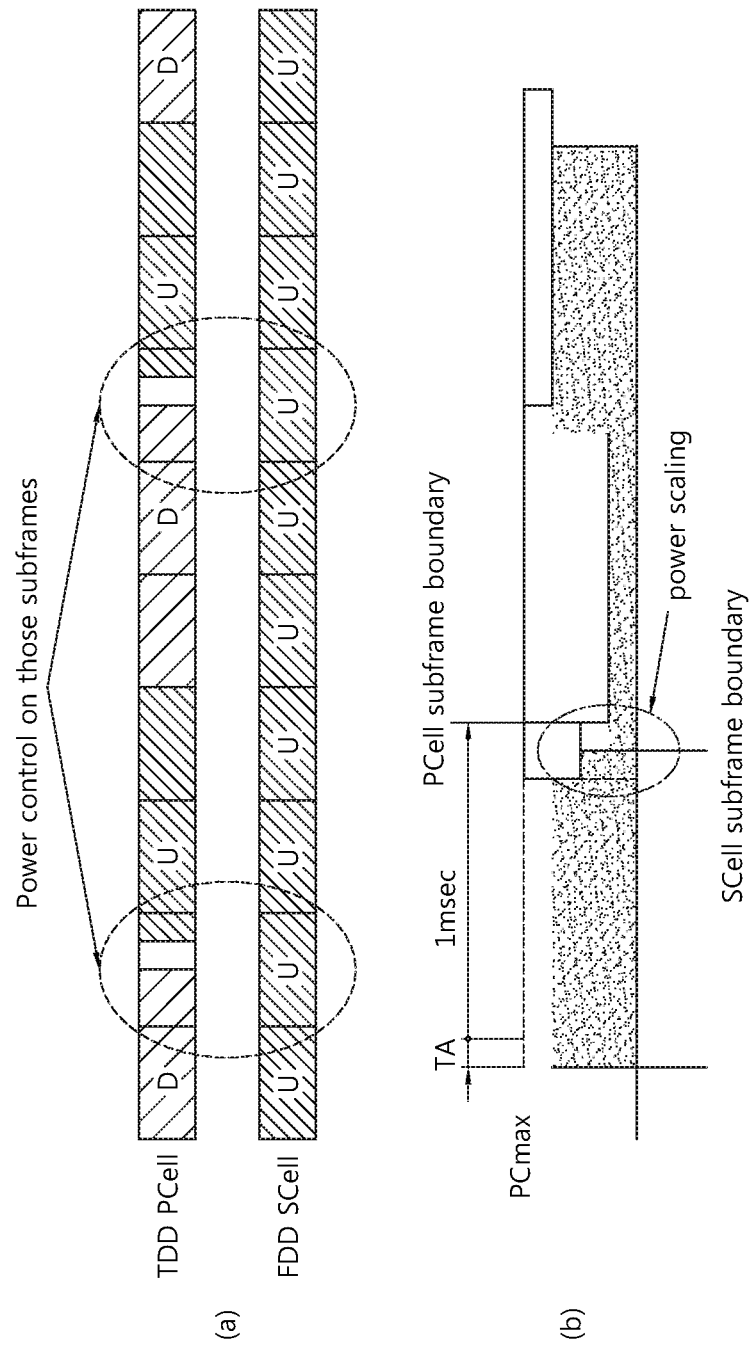
FIG. 14 shows an example of power control issue at a special subframe.

FIG. 14 shows an example of power control issue at a special subframe. Referring to FIG. 14-(a), PCell employs TDD, and SCell employs TDD. Subframes of PCell may follow one of TDD configurations. Referring to FIG. 14-(b), the regions on which the power scaling is performed is special subframes described in the FIG. 14-(a).

Assuming the UE is capable of transmitting more than one uplink simultaneously, the power control at subframes where one CC has special subframe and the other CC(s) have normal uplink subframe may be properly adjusted.

(1) PUCCH transmission at FDD SCell: If TDD PCell transmits SRS or PRACH while SCell transmit PUCCH, power scaling (if uplink power exceeds the maximum power) may not be occurred. Or, shortened PUCCH may be used (assuming two OFDM symbol shortened PUCCH is also available for PRACH+PUCCH transmission).

(2) PUSCH transmission at FDD SCell: If TDD PCell transmits SRS or PRACH while SCell transmit PUCCH, power scaling (if uplink power exceeds the maximum power) on the last two OFDM symbol may be used for PUSCH transmission if shortened PUSCH is not used. Or, one or two (depending on how many uplink symbols used for PCell uplink transmission) may be punctured for PUSCH transmission. Or, if PCell and SCell UL are connected via non-ideal backhaul, the UE may assume that always (regardless of PCell UL transmission at UpPTS) last one or two OFDM symbols (depending on special subframe configuration of PCell) will be punctured for the uplink transmissions. If may be further constrained to the case where the total uplink power exceeds the maximum power, the UE may assume that one or two last OFDM symbols (depending on special subframe configuration of PCell) will not be used for uplink transmission for SCell.

(3) SRS transmission at FDD SCell: If PCell and SCell are connected via non-ideal backhaul, the UE may not transmit SRS for SCell in those subframes where special subframe and normal uplink subframe collide with each other if SRS is configured for PCell in those subframes.

(4) PRACH transmission at FDD SCell: If PCell and SCell are connected via non-ideal backhaul, the UE may not transmit PRACH for SCell in those subframes where special subframe and normal uplink subframe collide with each other if PRACH is scheduled for PCell in those subframes.

When timing advance is used such that UpPTS OFDM symbol overlap with more than one SCell uplink subframe, second uplink subframe may be power scaled throughput the entire subframe except for the subframes where special subframe and normal uplink collide with each other at the last one or two OFDM symbols. If the total power exceeds the maximum during 1 ms duration, it may scale down the last few OFDM symbols.

If FDD is PCell whereas TDD is SCell, SRS/PRACH configured in SCell UpPTS may not be transmitted if total power exceeds maximum power. If FDD and TDD are aggregated over non-ideal backhaul, regardless of maximum power, UpPTS may be disabled. In other words, special subframe of SCell may be treated as "shortened" downlink subframe.

Other rules in terms of power scaling or dropping uplink channels to handle maximum power may follow the rules determined for handling multiple timing advance groups over ideal and non-ideal backhaul. When FDD and TDD are aggregated over non-ideal backhaul, power scaling on SRS and/or PUCCH may be disabled where other channels would be scaled-down regardless of PCell or SCell or SRS and/or PRACH may be omitted in subframes where potential case may be expected (e.g., subframe+normal uplink subframe). Other subframes power control may be handled by "pre-allocating" scale for each CC (e.g., 60%/40% scaling to PCell/SCell where power scaling would occur 60% and 40% ratio for PCell and SCell transmission) or avoidance of simultaneous transmission by TDM or pre-configured maximum power per CC (e.g., ½ PCMAX for PCell and ½ PCMAX for SCell) such that maximum power of each CC is limited and thus total power may not exceed the total PCMAX. Alternatively, the UE may be disabled with simultaneous transmission to eNBs which are connected via non-ideal backhaul to avoid potential ambiguity and so on. In this case, PCell may configure a bitmap of uplink subframes for each eNB (for TDM) or assign only one uplink CC (exclusive).

Handling eIMTA either in MeNB or SeNB is described. When eIMTA is used for any carrier either in MeNB or SeNB, power headroom report may be affected. Assuming a PHR is triggered for the MeNB, PHR value for SeNB carriers should be calculated such that it may give "lower bound" of PHR instead of too optimistic value. Thus, regardless of uplink subframe configuration from eIMTA perspective (either flexible or fixed uplink subframe), PHR on flexible subframe (i.e., higher power or lower PHR) may be reported. Alternatively, if eIMTA is configured for any carrier, two PHR values may be reported for that carrier. However, for carriers managed by the other eNB when PHR is reported to one eNB, it would be desirable to report only one PHR value not to change PHR report container format when eIMTA is configured for a carrier belonging to the other eNB.

In FDD/TDD inter-node aggregation or eIMTA or different TDD DL/UL configuration used by MeNB and SeNB, it is also feasible that carriers for SeNB would have downlink in a subframe reported PHR for the MeNB. According to current specification, the UE may report virtual power. Since, virtual power report may not be so useful, this invention proposes to assume "a default" resource allocation or uplink grant which can be used to calculate PHR when PUSCH has not been scheduled for a carrier. This default configuration (such as the resource allocation, MCS, etc) may be higher layer signaled to the UE which will be managed by the MeNB and coordinated between two eNBs via backhaul signaling. Alternatively, if the next subframe is uplink subframe, the UE may use the next subframe for PHR. The use of default uplink grant may be limited to carriers configured by the other eNB when PHR is reported to one eNB. If there is actual transmission to a carrier configured by the other eNB, a separate flag may be transmitted to notify whether default configuration has been used or any actual transmission has been occurred.

When asynchronous MeNB and SeNB are considered, it is also possible that MeNB and SeNB may not be aware of DL/UL configuration exactly at a moment. Thus, when virtual power or PHR based on default configuration is used for any downlink, instead of reporting PHR, it may report "Not applicable" PHR value and thus the other eNB knows that some subframes are not utilized for uplink transmission by the eNB. Or, simply the UE may omit PHR for a carrier with downlink in that PHR reporting subframe. For asynchronous between two eNBs, if uplink and downlink is overlapped, the UE may select uplink to report PHR.

Considering eIMTA dynamic reconfiguration of UL/DL, the UE may transmit the received UL/DL changes back to the other eNB via air interface. For example, a carrier belonging to the SeNB changes DL/UL configuration to configuration #5, it may be signaled back to the MeNB. To allow this signaling, PUCCH format 2 like content may be utilized.

In terms of power scaling, flexible uplink subframes under eIMTA may have lower priority as it cannot carry PUCCH. Thus, when power scaling would be needed, carriers with flexible uplink subframe would have lowest priority over other carriers.

When a UE is configured with eIMTA and CA (where each carrier configures eIMTA) and configured with two power control parameters, low power subframe may have higher priority over high power subframe (in other words, uplink transmission for a carrier without interference would have higher priority over uplink transmission for another carrier with interference). For example, CC1 and CC2 transmit PUSCH simultaneously when power limitation occurs, and the UE takes higher priority on CC1 if CC1 has uplink transmission without potential interference (and thus power boosting has not been requested).

Figure 15:
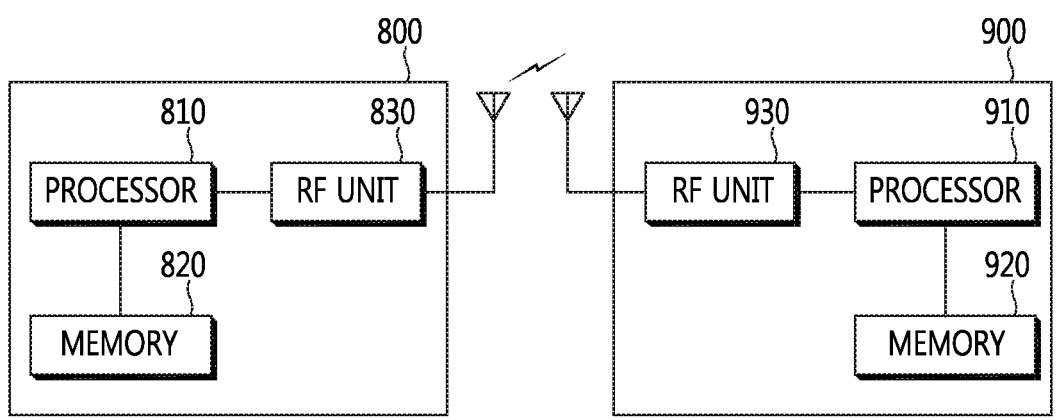
FIG. 15 is a block diagram showing wireless communication system to implement an embodiment of the present invention.

FIG. 15 is a block diagram showing wireless communication system to implement an embodiment of the present invention.

An eNB 800 may include a processor 810, a memory 820 and a radio frequency (RF) unit 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The RF unit 830 is operatively coupled with the processor 810, and transmits and/or receives a radio signal.

A UE 900 may include a processor 910, a memory 920 and a RF unit 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The RF unit 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The RF units 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method for controlling, by a user equipment (UE), an uplink power for dual connectivity in a wireless communication system, wherein the UE is connected to both a first eNodeB (eNB) and a second eNB in asynchronous dual connectivity in which the first eNB and the second eNB are not aligned with each other, the method comprising:
   configuring a first maximum power or a second maximum power, wherein the first maximum power is used in subframes where uplink (UL) transmission is performed to only one of the first eNB or the second eNB, and the second maximum power is used in subframes where the UL transmission can be performed to both the first and second eNBs;
   determining whether there is UL transmission to the second eNB in a subframe;
   setting a transmission power for transmission to the first eNB in the subframe according to the first maximum power when there is no UL transmission to the second eNB in the subframe; and
   setting a transmission power for transmission to the first eNB in the subframe according to the second maximum power when there is UL transmission to the second eNB in the subframe.

2. The method of claim 1, further comprising transmitting UL signals to the first eNB in the subframe by using the transmission power for the first eNB.

3. The method of claim 1, wherein the subframe is a frequency division duplex (FDD) subframe in the first eNB, and
   wherein the subframe is a time division duplex (TDD) downlink (DL) subframe in the second eNB.

4. The method of claim 1, wherein the first eNB has a plurality of component carriers (CCs), and
   wherein the second eNB has a plurality of CCs.

5. The method of claim 1, wherein the determining whether there is UL transmission to the second eNB in the subframe is based on a higher-layer signaling.

6. The method of claim 5, wherein the higher-layer signaling corresponds to a TDD UL/DL configuration of the second eNB.

7. The method of claim 1, wherein the first eNB corresponds to a master cell group (MCG) in dual connectivity, and
   wherein the second eNB corresponds to a secondary cell group (SCG) in dual connectivity.

8. The method of claim 1, wherein the first eNB corresponds to a SCG in dual connectivity, and
   wherein the second eNB corresponds to a MCG in dual connectivity.

9. The method of claim 1, wherein the subframe is a TDD UL subframe in the first eNB, and
   wherein the subframe is a TDD DL subframe in the second eNB.

10. The method of claim 9, wherein the first eNB and the second eNB have different TDD configurations.

11. The method of claim 1, wherein the second eNB is in a discontinuous reception (DRX) state in the subframe.

12. A user equipment (UE) in a wireless communication system, wherein the UE is connected to both a first eNodeB (eNB) and a second eNB in asynchronous dual connectivity in which the first eNB and the second eNB are not aligned with each other, the UE comprising:
    a memory;
    a radio frequency (RF) unit; and
    a processor, coupled to the memory and the RF unit, that:
    configures a first maximum power or a second maximum power, wherein the first maximum power is used in subframes where uplink (UL) transmission is performed to only one of the first eNB or the second eNB, and the second maximum power is used in subframes where the UL transmission can be performed to both the first and second eNBs,
    determines whether there is UL transmission to the second eNB in a subframe, and
    sets a transmission power for transmission to the first eNB in the subframe according to the first maximum power when there is no UL transmission to the second eNB in the subframe, and
    sets a transmission power for transmission to the first eNB in the subframe according to the second maximum power when there is UL transmission to the second eNB in the subframe.

* * * * *